United States Patent [19]

Yamanaka

[11] Patent Number: 4,999,723

[45] Date of Patent: Mar. 12, 1991

[54] MAGNETIC RECORDING AND REPRODUCING DEVICE HAVING A CASSETTE LOADING MECHANISM DRIVEN BY A PINCH ROLLER

[75] Inventor: Takashi Yamanaka, Tokyo, Japan

[73] Assignee: Tanashin Denki Co., Ltd., Tokyo, Japan

[21] Appl. No.: 431,194

[22] Filed: Nov. 3, 1989

Related U.S. Application Data

[62] Division of Ser. No. 127,756, Dec. 2, 1987, Pat. No. 4,914,536.

[30] Foreign Application Priority Data

May 30, 1987 [JP] Japan ................................ 62-137538

[51] Int. Cl.⁵ .......................................... G11B 15/675
[52] U.S. Cl. .................................................. 360/96.5
[58] Field of Search ............................. 360/96.5, 96.6

[56] References Cited

U.S. PATENT DOCUMENTS 4,423,445 12/1983 Okada et al. ..................... 360/96.5

Primary Examiner—Robert S. Tupper
Attorney, Agent, or Firm—Wegner, Cantor, Mueller & Player

[57] ABSTRACT

A magnetic recording and reproducing device wherein operation timings of various mechanisms can be set with a high degree of accuracy and construction for driving the individual mechanisms is simplified with a reduced number parts. The device comprises a single cam plate having cams for selectively operating a turning force transmission change-over mechanism, a tape loading mechanism, a pinch roller driving mechanism, a rotational speed change-over mechanism, a brake mechanism and a back tension mechanism. The cam plate is driven to rotate by a motor and transmits the turning force of the motor as a driving force to the mechanisms listed. The brake device is also improved in that slackening of a tape is not caused for a time after completion of a fast feeding mode or a rewinding mode until a reproducing mode or a recording mode is subsequently started.

5 Claims, 25 Drawing Sheets

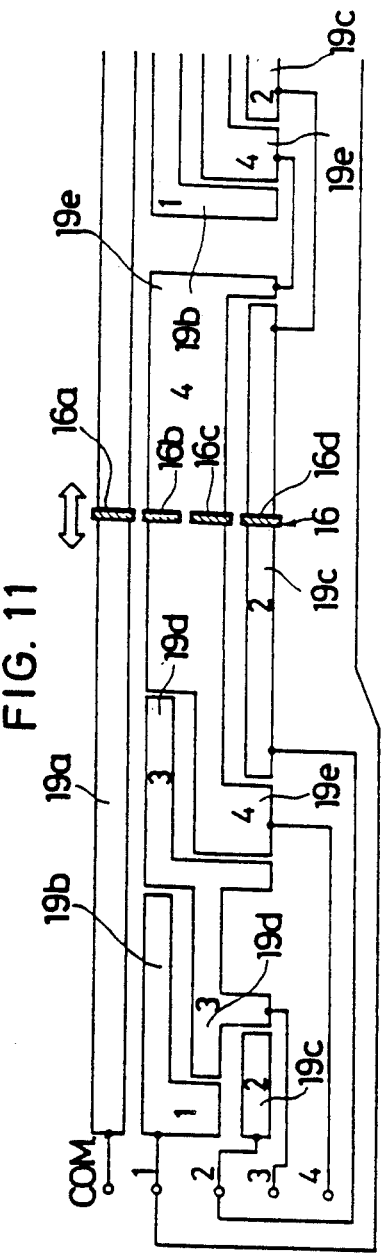
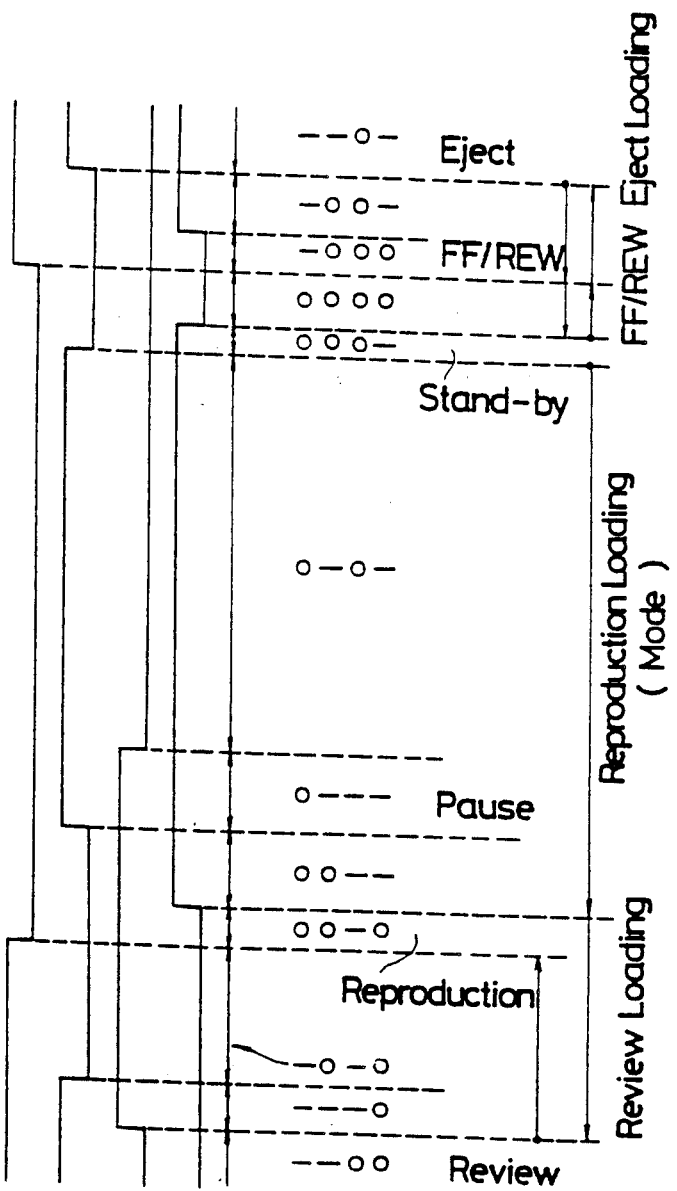
FIG. 11

MAGNETIC RECORDING AND REPRODUCING DEVICE HAVING A CASSETTE LOADING MECHANISM DRIVEN BY A PINCH ROLLER

This application is a divisional of Ser. No. 127,756, filed Dec. 2, 1987, now U.S. Pat. No. 4,914,536, granted Apr. 3, 1990.

BACKGROUND OF THE INVENTION

1. Field of the Invention

This invention relates to a magnetic recording and reproducing device such as a VTR (video tape recorder).

2. Description of the Prior Art

A magnetic recording and reproducing device is already known which includes a turning force transmission change-over mechanism for alternatively changing over a turning force transmitting condition and a turning force non-transmitting condition in which a driving turning force is transmitted and not transmitted, respectively, to a cassette loading mechanism which, when a cassette is inserted to a predetermined condition into a cassette housing, moves the cassette to a loaded position in which the cassette is fitted on reel shafts of a supply side reel base and a take-up side reel base and which moves, in response to a cassette unloading instruction signal, the cassette from the loaded position to an unloaded position in which the cassette is discharged outwardly of the cassette housing, a tape loading mechanism for drawing out a magnetic tape from within the cassette at the loaded position and extending the same over a predetermined angular range on an outer periphery of a guide cylinder which has a magnetic head thereon, a brake mechanism for selectively applying a braking force to the supply side reel base and the take-up side reel base, a pinch roller driving mechanism for moving a pinch roller into and out of contact with a capstan, a back tension mechanism for selectively applying a resisting force to the supply side reel base and the take-up side reel base to prevent slackening of the magnetic tape, and a rotational speed change-over mechanism for selectively changing a gear ratio to change over the rotational speed of the supply side reel base and the take-up side reel base.

In such a conventional magnetic recording and reproducing device, a plurality of motors and/or some other actuators such as electromagnetic solenoids are provided for each of various mechanisms or for each group of several mechanisms. Accordingly, it is difficult to control operation timings of the mechanisms with a high degree of accuracy, and the magnetic recording and reproducing device is complicated in construction and requires a large number of components and a large number of man-hours for assembly, resulting in a high production cost.

Further, in such a conventional magnetic recording and reproducing device as described above, detecting devices are provided for various mechanisms for detecting their individual operation mode positions. A detection signal from each of the detecting mechanisms is delivered as operation mode position information of the detecting mechanism to an electronic control device which thus controls associated mechanisms to provide for an operation mode which is set at a mode setting section of the magnetic recording and reproducing device. Accordingly, the detecting devices for detecting operation mode positions of the various mechanisms are complicated in construction and occupy a substantial spacing, and the magnetic recording and reproducing device requires a large number of components and a large number of man-hours for assembly, resulting in a high production cost.

SUMMARY OF THE INVENTION

It is an object of the present invention to provide a magnetic recording and reproducing device wherein operation timings of various mechanisms can be set with a high degree of accuracy, construction for driving the individual mechanisms is simplified, the number of parts and the number of man-hours for assembly can be reduced, and reduction of the cost can be attained smoothly.

It is another object of the present invention to provide a magnetic recording and reproducing device wherein construction for detecting operation mode positions of the individual mechanisms is simplified and reduction in size can be attained.

It is a further object of the present invention to provide a magnetic recording and reproducing device wherein a cassette loading mechanism can be driven without the necessity of provision of a motor for exclusive use therefor or some other special means.

It is a still another object of the present invention to provide a brake device for a magnetic recording and reproducing device which does not cause slackening of a tape for a time after completion of a fast feeding mode or a rewinding mode until a reproducing mode or a recording mode is subsequently started and which eliminates the necessity of a driving source for exclusive use therefor.

In order to attain the objects, according to one aspect of the present invention, a magnetic recording and reproducing device which includes a turning force transmission change-over mechanism for alternatively changing over a turning force transmitting condition and a turning force non-transmitting condition in which a driving turning force is transmitted and not transmitted, respectively, to a cassette loading mechanism which, when a cassette is inserted to a predetermined condition into a cassette housing, moves the cassette to a loaded position in which the cassette is fitted on reel shafts of a supply side reel base and a take-up side reel base and which moves, in response to a cassette unloading instruction signal, the cassette from the loaded position to an unloaded position in which the cassette is discharged outwardly of the cassette housing, a tape loading mechanism for drawing out a magnetic tape from within the cassette at the loaded position and extending the same over a predetermined angular range on an outer periphery of a guide cylinder which has a magnetic head thereon, a brake mechanism for selectively applying a braking force to the supply side reel base and the take-up side reel base, a pinch roller driving mechanism for moving a pinch roller into and out of contact with a capstan, a back tension mechanism for selectively applying a resisting force to the supply side reel base and the take-up side reel base to prevent slackening of the magnetic tape, and a rotational speed change-over mechanism for selectively changing a gear ratio to change over the rotational speed of the supply side reel base and the take-up side reel base, is characterized in that it comprises a single cam plate having cam means for selectively operating all of the mechanisms listed above, and a motor for driving the cam plate to rotate, whereby the turning force of the motor is selectively transmitted as a driving force to all of the mechanisms listed above via the cam plate.

With the magnetic recording and reproducing device, the turning force of the motor is transmitted via the single cam plate as a driving force to the turning force transmission change-over mechanism, tape loading mechanism, brake mechanism, pinch roller driving mechanism, back tension mechanism and rotational speed change-over mechanism.

Accordingly, various effects can be anticipated: namely, operation timings of the various mechanisms can be set with a high degree of accuracy; construction for driving the individual mechanisms can be simplified; the number of parts and the number of man-hours for assembly can be reduced and the cost can be reduced smoothly; and so on.

According to another aspect of the present invention, a magnetic recording and reproducing device which includes a turning force transmission change-over mechanism for alternatively changing over a turning force transmitting condition and a turning force non-transmitting condition in which a driving turning force is transmitted and not transmitted, respectively, to a cassette loading mechanism which, when a cassette is inserted to a predetermined condition into a cassette housing, moves the cassette to a loaded position in which the cassette is fitted on reel shafts of a supply side reel base and a take-up side reel base and which moves, in response to a cassette unloading instruction signal, the cassette from the loading position to an unloaded position in which the cassette is discharged outwardly of the cassette housing, a tape loading mechanism for drawing out a magnetic tape from within the cassette at the loaded position and extending the same over a predetermined angular range on an outer periphery of a guide cylinder which has a magnetic head thereon, a brake mechanism for selectively applying a braking force to the supply side reel base and the take-up side reel base, a pinch roller driving mechanism for moving a pinch roller into and out of contact with a capstan, a back tension mechanism for selectively applying a resisting force to the supply side reel base and the take-up side reel base to prevent slackening of the magnetic tape, and a rotational speed change-over mechanism for selectively changing a gear ratio to change over the rotational speed of the supply side reel base and the take-up side reel base, is characterized in that it comprises a single rotatable cam plate having thereon cam means for selectively operating all of the mechanisms listed above, the cam plate further having a contact device thereon, a motor for driving the cam plate to rotate, a wiring plate having contacts for selectively contacting with the contact device, and a controller operable in response to a mode setting instruction signal for controlling the cam plate to a position corresponding to a mode indicated by the mode setting instruction signal depending upon position information of the cam plate which is obtained from contacting and non-contacting relations between the contact device and the contacts of the wiring plate, whereby the turning force of the motor is selectively transmitted as a driving force to all of the mechanisms listed above via the cam plate.

With the magnetic recording and reproducing device, as the contacting relationship between the contact device of the cam plate and the contacts of the wiring plate changes upon rotation of the cam plate, operation mode position information of the cam plate is produced, and in response to such position information, the cam plate is set to a position corresponding to a mode indicated by the mode setting instruction signal.

Accordingly, in addition to the effects of the first aspect of the present invention described above, an additional effect can be anticipated that construction for detection of operation mode positions of the individual mechanisms can be simplified and reduced in size.

According to a further aspect of the present invention, a magnetic recording and reproducing device which includes a cassette loading mechanism which, when a cassette is inserted to a predetermined condition into a cassette housing, moves the cassette to a loaded position in which the cassette is fitted on reel shafts and which discharges, in response to a cassette unloading instruction signal, the cassette from the loaded position outwardly of the cassette housing and wherein rotation of a capstan motor is transmitted to a tape driving mechanism by way of a pair of pulleys and an endless belt, is characterized in that it comprises a pinch roller connected to the cassette loading mechanism, and a movable member on which the pinch roller is supported for rotation, whereby the pinch roller is pressed against the endless belt so that the former may be rotated by the latter in order to drive the cassette loading mechanism by a turning force of the pinch roller.

With the magnetic recording and reproducing device, as the pinch roller is pressed against the endless belt which transmits rotation of the capstan motor to the tape driving mechanism, it is rotated by and together with the endless belt. Consequently, the cassette loading mechanism is operated by the turning force of the pinch roller.

Accordingly, the cassette loading mechanism is operated utilizing the turning force of the capstan motor without provision of a motor or some other special means for exclusive use for driving of the cassette loading mechanism. Accordingly, the magnetic recording and reproducing device can be simplified in construction and reduced in size, and accordingly reduction in production cost can be attained smoothly.

According to a still another aspect of the present invention, a brake device for a magnetic recording and reproducing device comprises a cam motor which rotates forwardly in response to a reproduction mode setting instruction signal or a recording mode setting instruction signal and rotates reversely in response to a fast feeding mode setting instruction signal or a rewinding mode setting instruction signal until a position thereof corresponding to a mode indicated by such an instruction signal is reached, a first movable member mounted for reciprocal movement and normally biased by a spring, the first movable member putting a low speed side gear into a rotation transmitting route from a capstan motor to reel bases when the first movable member is moved in one direction by the biasing force of the spring, the first movable member putting the low speed side gear out of the rotation transmitting route when the first movable member is moved in the other direction, a second movable member mounted for reciprocal movement and normally biased by a spring, the second movable member putting a high speed side gear out of the rotation transmitting route when the first movable member is moved in one direction by the biasing force of the spring, the second movable member putting the low speed side gear into the rotation transmitting route when the second movable member is moved in the other direction, a connecting mechanism for selectively connecting the first and second movable members to each other so that, when the first movable member is moved in the other direction, the second movable member may be moved in the same direction, a take-up side brake member which applies a braking force to a take-up side one of the reel bases for a time after a mode in which the cam motor rotates reversely is completed until another mode in which the cam motor rotates forwardly is started and which is operated, when the second movable member is moved in the other direction, by the second movable member to cancel the application of a braking force thereof to the take-up side reel base, a supply side brake member which applies a braking force to a supply side one of the reel bases for a time after a mode in which the cam motor rotates reversely is completed until another mode in which the cam motor rotates forwardly is started and which is operated, during setting of any mode and in response to operation of the take-up side brake member to cancel the application of a braking force thereof, to cancel the application of a braking force thereof to the supply side reel base, and a canceling mechanism which is operated by the turning force of the cam motor upon forward rotation of the cam motor to cancel the connection between the first and second movable members by the connecting mechanism.

With the brake device for a magnetic recording and reproducing device, if an operation to change over the magnetic recording and reproducing device to a reproducing mode or a recording mode after completion of a fast feeding mode or a rewinding mode, a braking force is applied to both of the reel bases until the reproducing or recording mode is started in response to such operation. The brake members are operated in response to operation of the first or second movable member associated with a changing over operation of a rotational speed change-over mechanism.

Accordingly, various effects can be anticipated. In particular, there is no possibility that a tape may be slackened for a time after completion of a fast feeding mode or a rewinding mode until a reproducing mode or a recording mode is started because a braking force is applied to both the supply side reel base and the take-up side reel base. Besides, since no special driving means for operating the brake members such as a solenoid is necessitated, the brake device can be simplified in construction and reduced in size and weight, and accordingly the production cost of the brake device can be reduced. Further, since the brake members are operated utilizing a motion of a movable member associated with a mechanism for changing over the rotational speed of the reel bases, the timing of a rotational speed changing over operation and the timing of an operation to change over the brake members can be synchronized with a high degree of accuracy without using a complicated synchronizing mechanism or the like.

The above and other objects, features and advantages of the present invention will become apparent from the following description and the appended claims, taken in conjunction with the accompanying drawing.

BRIEF DESCRIPTION OF THE DRAWINGS

FIG. 11 is a diagrammatic representation illustrating a relationship of various mode manners of the device of FIG. 1 to a contacting condition between a contact device of the cam plate and contacts of the wiring plate;

DESCRIPTION OF THE PREFERRED EMBODIMENT

Figure 1:
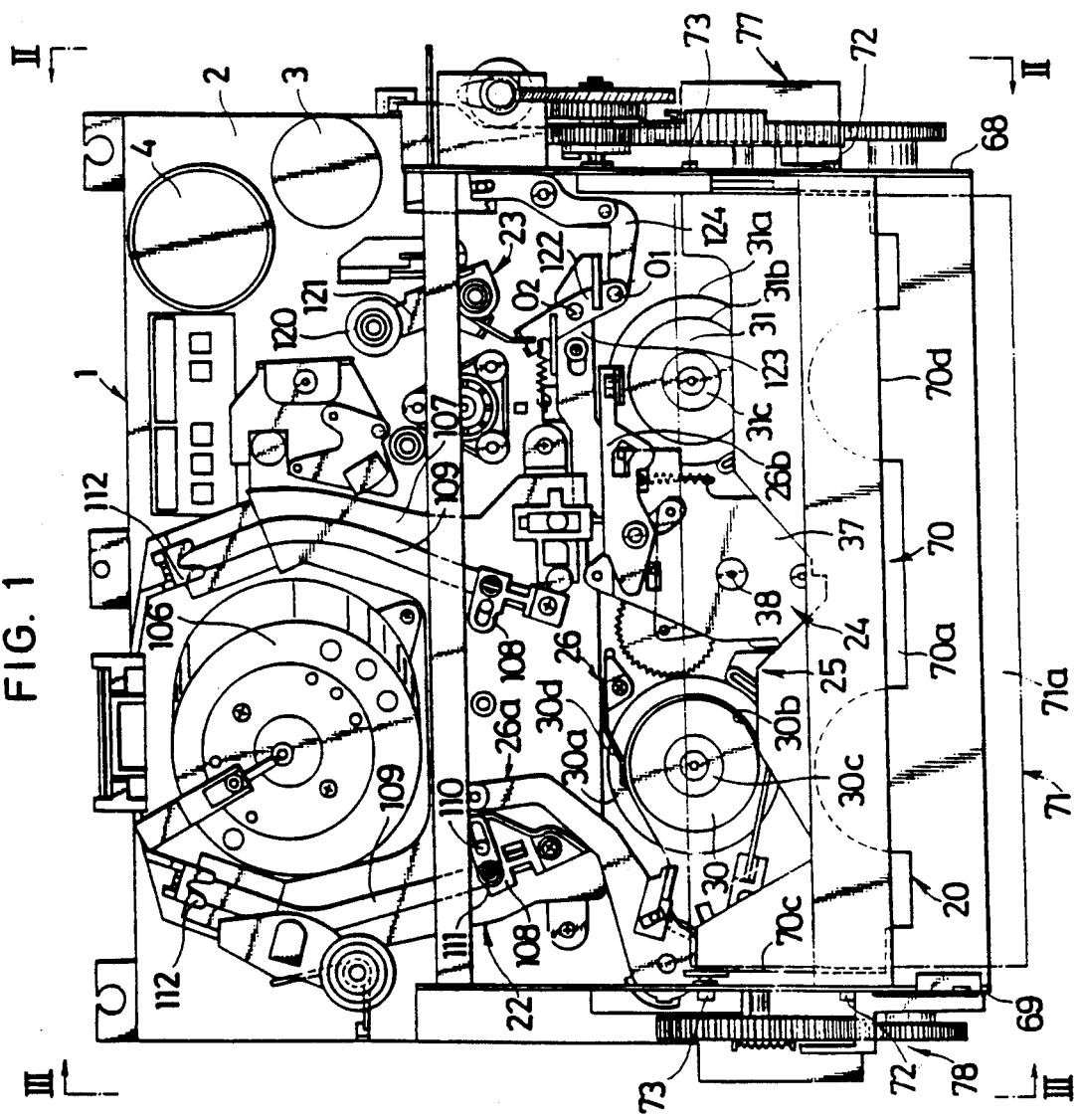
FIG. 1 is a top plan view of a magnetic recording and reproducing device with a housing omitted, showing a preferred embodiment of the present invention.

Referring first to FIGS. 1 to 6, a magnetic recording and reproducing device to which the present invention is applied is generally denoted at 1. The magnetic recording and reproducing device 1 includes a cam motor 3, a capstan motor 4 and a guide cylinder motor 5 all mounted on a chassis 2.

The cam motor 3 rotates forwardly when the magnetic recording and reproducing device 1 is either in a reproducing mode or in a recording mode but rotates reversely when the magnetic recording and reproducing device 1 is in a fast feeding mode or in a rewinding mode. The turning force of the cam motor 3 is transmitted to a cam plate 7 via a first motion transmitting mechanism 6.

Figure 6:
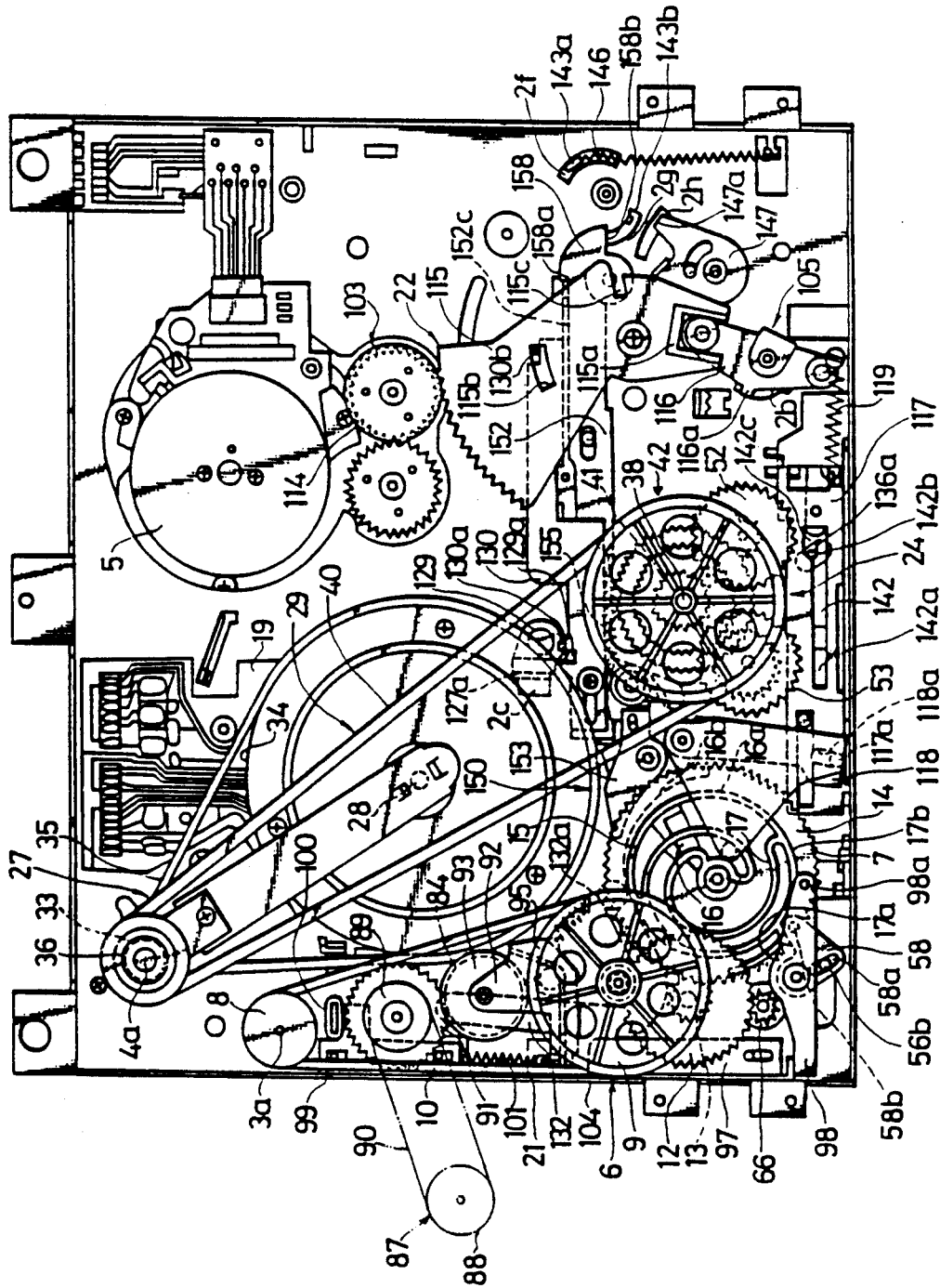
FIG. 6 is a bottom plan view of the device of FIG. 1.

Referring to FIG. 6, the motion transmitting mechanism 6 is located on a lower or reverse face of the chassis 2 and includes a first pulley 8 of a smaller diameter securely mounted on a drive shaft 3a of the cam motor 3 and having a V-shaped groove formed along an outer periphery thereof, a second pulley 9 of a larger diameter mounted for rotation on the lower face of the chassis 2 and having a V-shaped groove formed along an outer periphery thereof, an endless belt 10 in the form of an angular belt of a square cross section made of a rubber material or the like and extending between and around the first and second pulleys 8, 9, a first gear 11 of a smaller diameter provided in an integral concentrical relationship at the center of an upper face of the second pulley 9, a second gear 12 of a larger diameter mounted for rotation on the lower face of the chassis 2 and held in meshing engagement with the first gear 11, and a third gear 13 of a smaller diameter provided in an integral concentrical relationship at the center of an upper face of the second gear 12.

Figure 7:
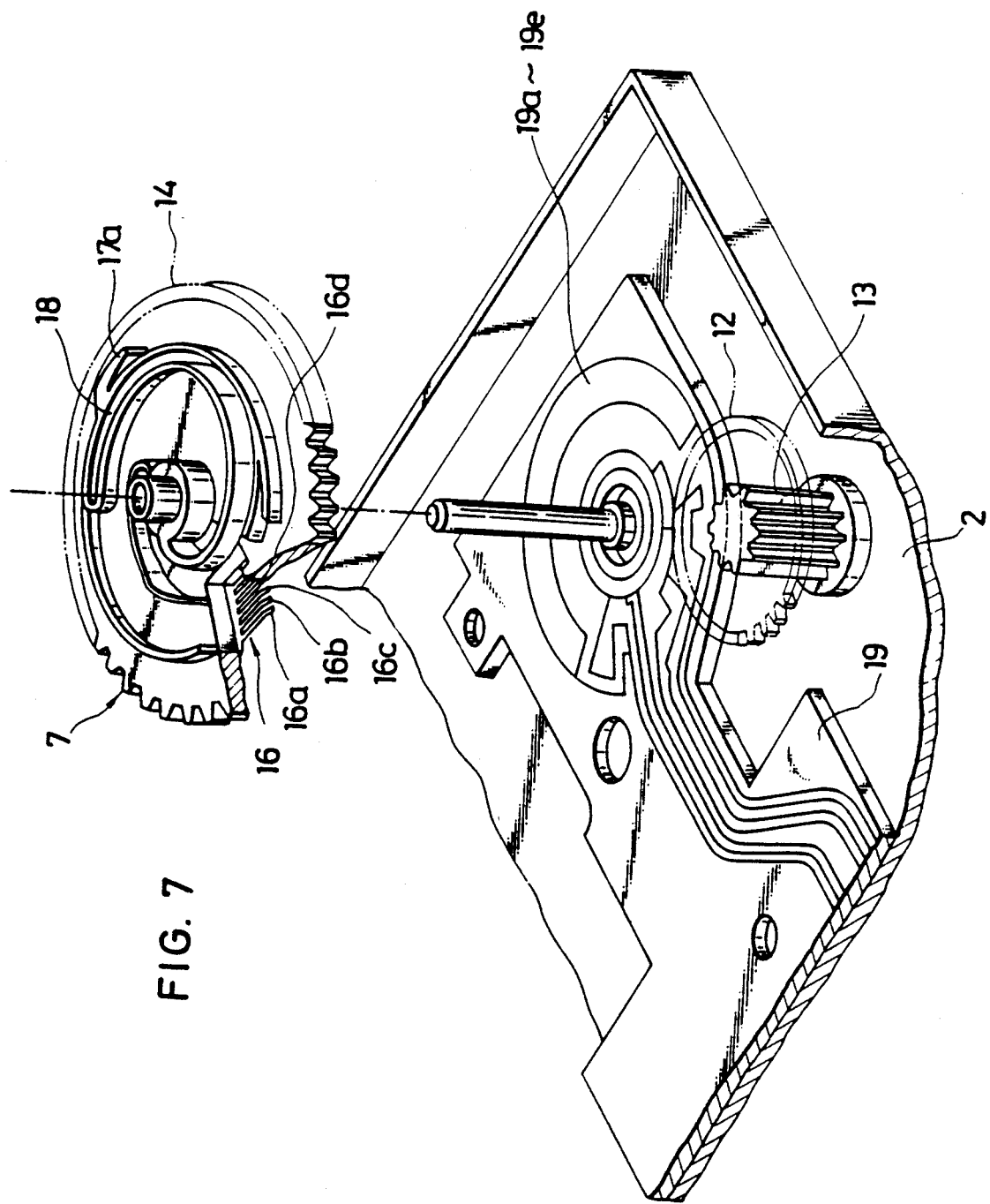
FIG. 7 is an enlarged fragmentary perspective view, partly broken, of a cam plate and an associated wiring plate of the device of FIG. 1.
Figure 8:
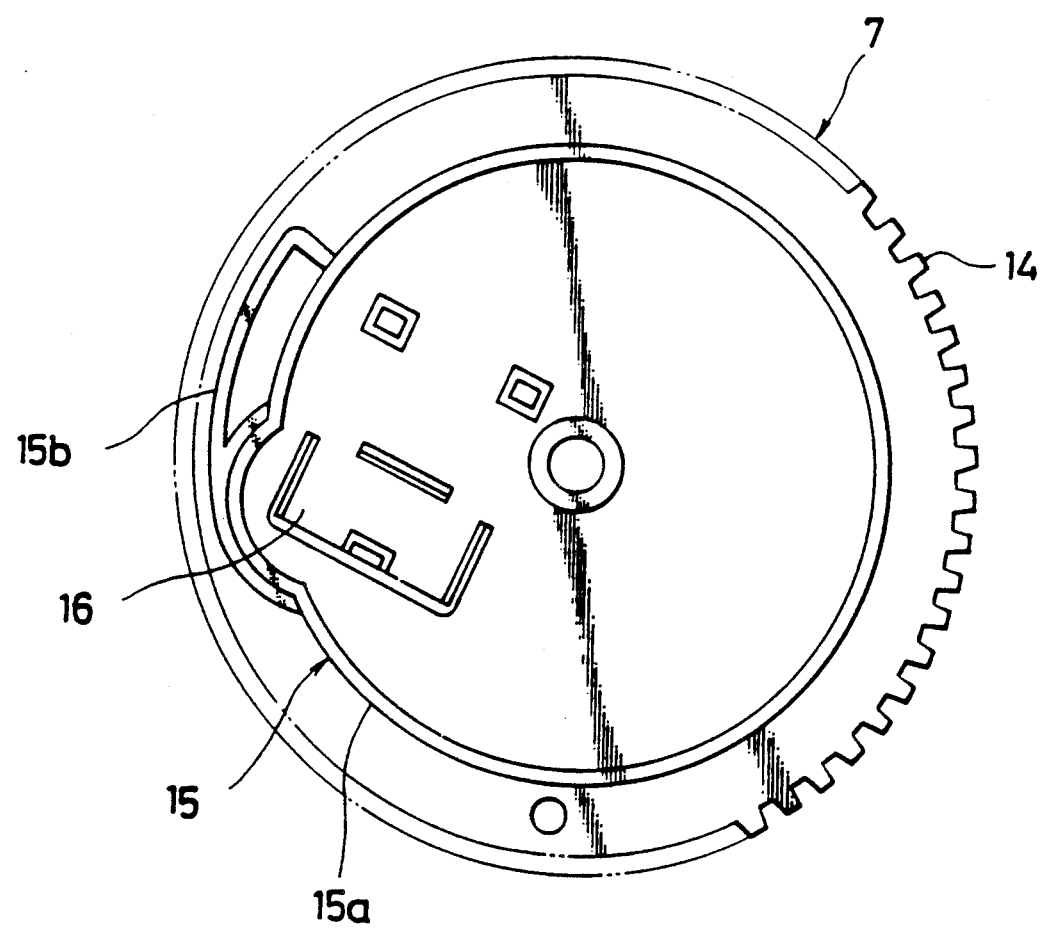
FIG. 8 is a top plan view of the cam plate of FIG. 7.
Figure 9:
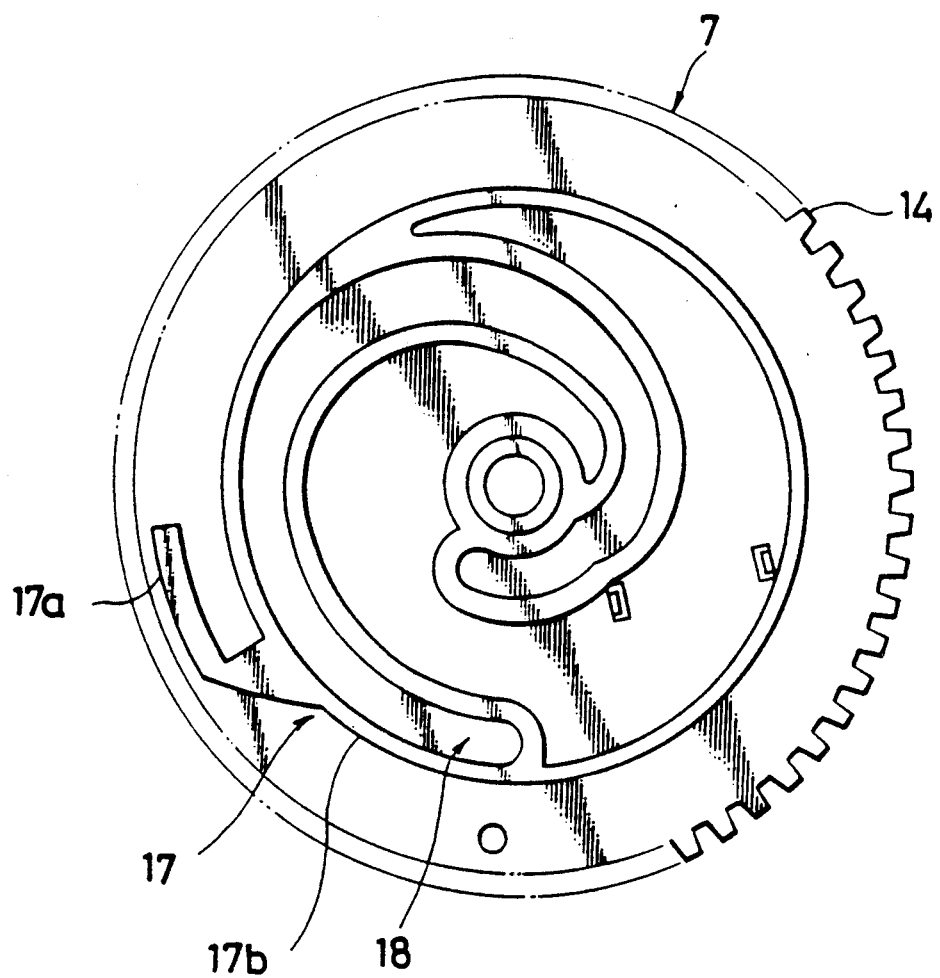
FIG. 9 is a bottom plan view of the cam plate of FIG. 7.
Figure 10:
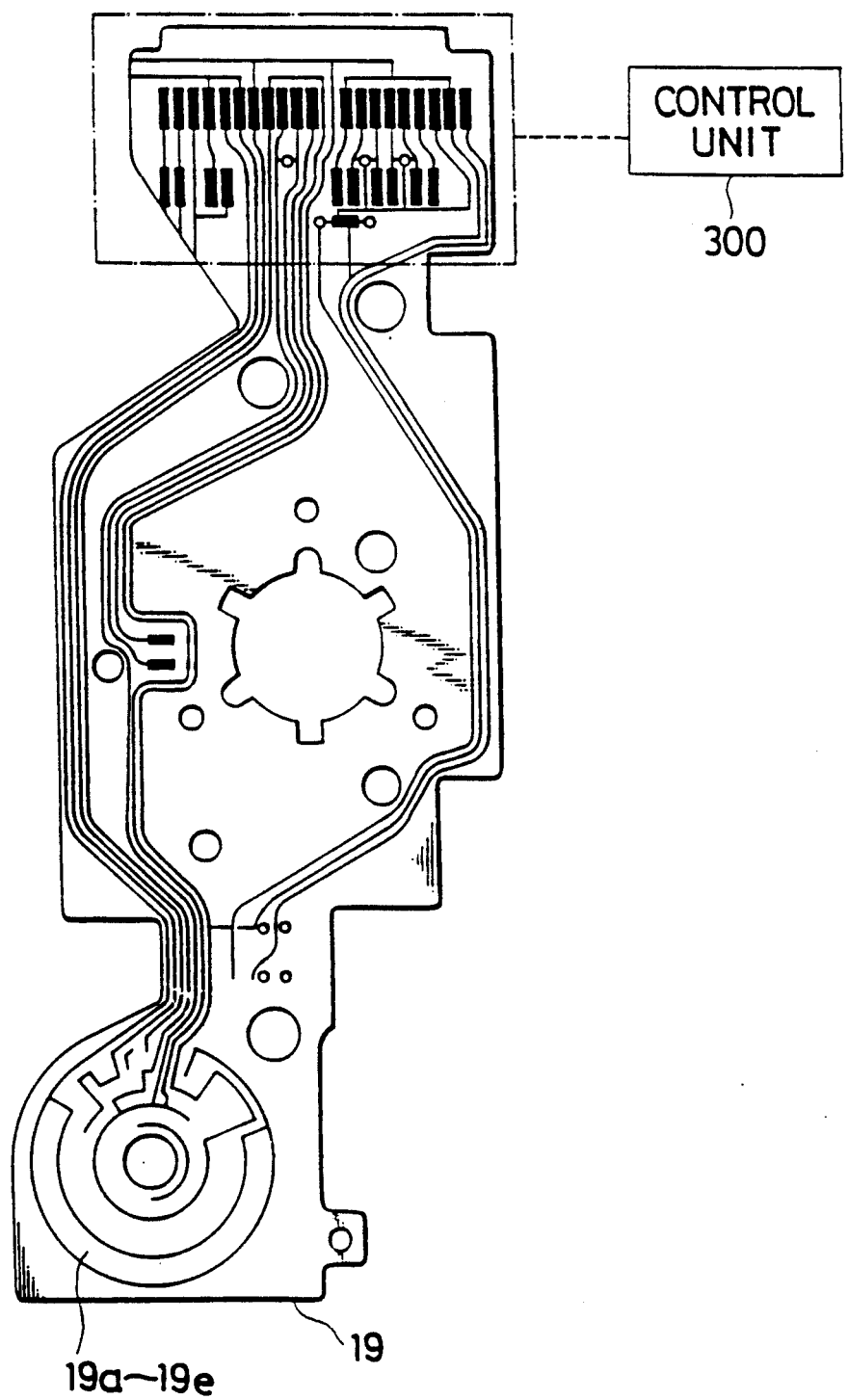
FIG. 10 is a plan view of the wiring plate of the device of FIG. 7.

Referring also to FIG. 7, the cam plate 7 is mounted for back and forth rotation on the lower face of the chassis 2. The cam plate 7 includes a gear 14 held in meshing engagement with the third gear 13 of the motion transmitting mechanism 6, and a conductive contact device 16 located on an upper face of the gear 14. The contact device 16 includes a first cam 15 as shown in FIG. 8 and four contact fingers 16a, 16b, 16c and 16d as shown in FIG. 7. The first contact finger 16a of the contact device 16 is normally held in sliding contact with a common contact 19a located on a wiring plate 19 as shown in FIG. 10 while the second to fourth contact fingers 16b to 16d are arranged for sliding contact with first, second, third and fourth contacts 19b, 19c, 19d and 19e also located on the wiring plate 19. The cam plate 7 further includes second and third cams 17 and 18 located on a lower face of the gear 14 as shown in FIG. 9.

The wiring plate 19 may be a printed circuit board as shown in FIG. 10 and is securely mounted on the lower face of the chassis 2 as shown in FIG. 7. The contacts 19a to 19e of the wiring plate 19 are electrically connected to a control unit 300 together with the contact device 16 of the cam plate 7. Thus, in response to position information produced depending upon a contacting or non-contacting relationship of the contact device 16 of the cam plate 7 with the contacts 19b to 19e of the wiring plate 19, the controller controls the cam plate 7 to move to and stay at a position corresponding to one of various modes (stopping, recording, reproducing, fast feeding, rewinding, pause, reviewing and so on) which is set by a mode setting means (not shown) of the magnetic recording and reproducing device 1.

The contacting or non-contacting relationship between the contact device 16 of the cam plate 7 and the first to fourth contacts 19b to 19e of the wiring plate 19 with respect to the position of the cam plate 7 is illustrated in FIG. 11. In FIG. 11, FF/REW denotes fast feeding/rewinding.

Referring back to FIGS. 1 and 6, the turning force of the cam motor 3 is transmitted via the first motion transmitting mechanism 6 and the cam plate 7 as a driving force to a turning force transmission change-over mechanism 21 for a cassette loading mechanism 20, a tape loading mechanism 22, a pinch roller driving mechanism 23, a rotational speed change-over mechanism 24, a brake mechanism 25 and a back tension mechanism 26, all of which will be hereinafter described in detail.

Meanwhile, the turning force of the capstan motor 4 is transmitted to a capstan 28 via a second motion transmitting mechanism 27 and to a supply side reel base 30 and a take-up side reel base 31 via a third motion transmitting mechanism 29 and the rotational speed change-over mechanism 24. The reel bases 30, 31 are mounted for rotation in a spaced relationship on the upper face of the chassis 2. The reel bases 30, 31 have larger diameter circumferential side faces 30a, 31a, smaller diameter circumferential side faces 30b, 31b, reel shaft 30c, 31, and gears 30d, 31d, respectively.

The second motion transmitting mechanism 27 is located on the lower face of the chassis 2 and includes a first pulley 33 of a smaller diameter securely mounted on a drive shaft 4a of the capstan motor 4 and having a circumferential groove formed along an outer periphery thereof, a second pulley or fly-wheel 34 of a larger diameter securely mounted for integral rotation at a lower end of the capstan 28 and having no circumferential groove formed therein, and an endless belt 35 in the form of a flat belt of a flattened rectangular cross section made of a rubber material or the like and extending between the pulleys 33, 34. The capstan 28 is mounted for rotation on the upper face of the chassis 2, and a pinch roller 120 hereinafter described is brought into and out of contact with the capstan 28.

The third motion transmitting mechanism 29 includes a first pulley 36 of a smaller diameter with a V-shaped peripheral groove securely mounted on the drive shaft 4a of the capstan motor 4 and located below the first pulley 33 of the second motion transmitting mechanism 27, a second pulley 39 of a larger diameter with a V-shaped peripheral groove fitted for rotation on a shaft 38, an endless belt 40 in the form of an angular belt of a square cross section made of a rubber material or the like and extending between the pulleys 36, 39, and a gear 41 of a small diameter located in an integral concentrical relationship at the center of an upper face of the second pulley 39. The shaft 38 on which the second pulley 39 is mounted for rotation is securely mounted at an upper end thereof on a sub-chassis 37 which is in turn mounted at a location on the upper face of the chassis 2 between the supply side reel base 30 and the take-up side reel base 31 as also seen in FIG. 5.

The rotational speed change-over mechanism 24 includes a gear mechanism 42 and a link mechanism 43 as shown in FIGS. 5 and 6 and FIGS. 16 to 20 and is designed so as to change over the rotational speed of the supply side reel base 30 and the take-up side reel base 31 by changing the gear ratio of the gear mechanism 42.

Figure 16:
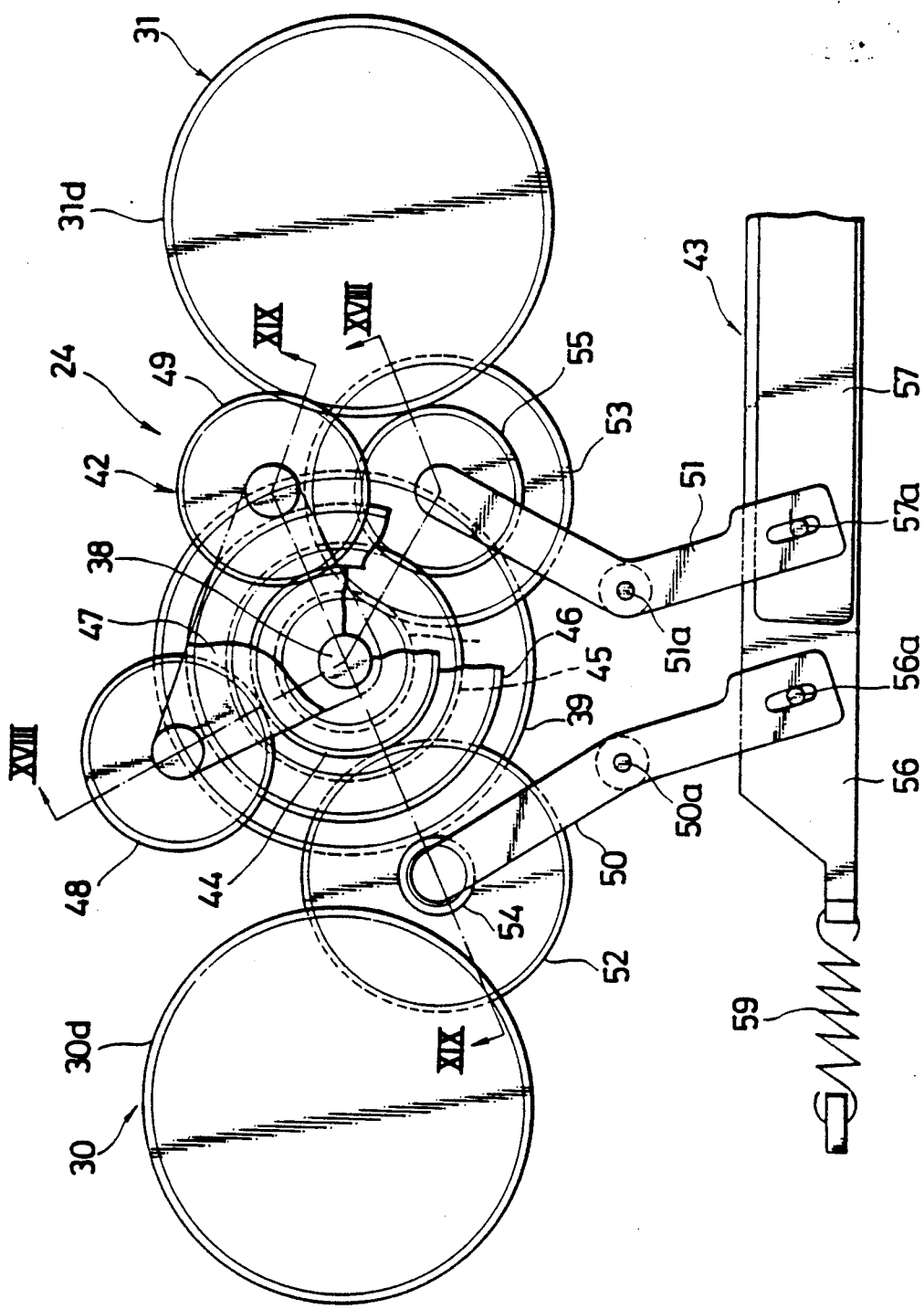
FIGS. 16 and 17 are schematic views showing operation of a rotational speed change-over mechanism of the device of FIG. 1.
Figure 17:
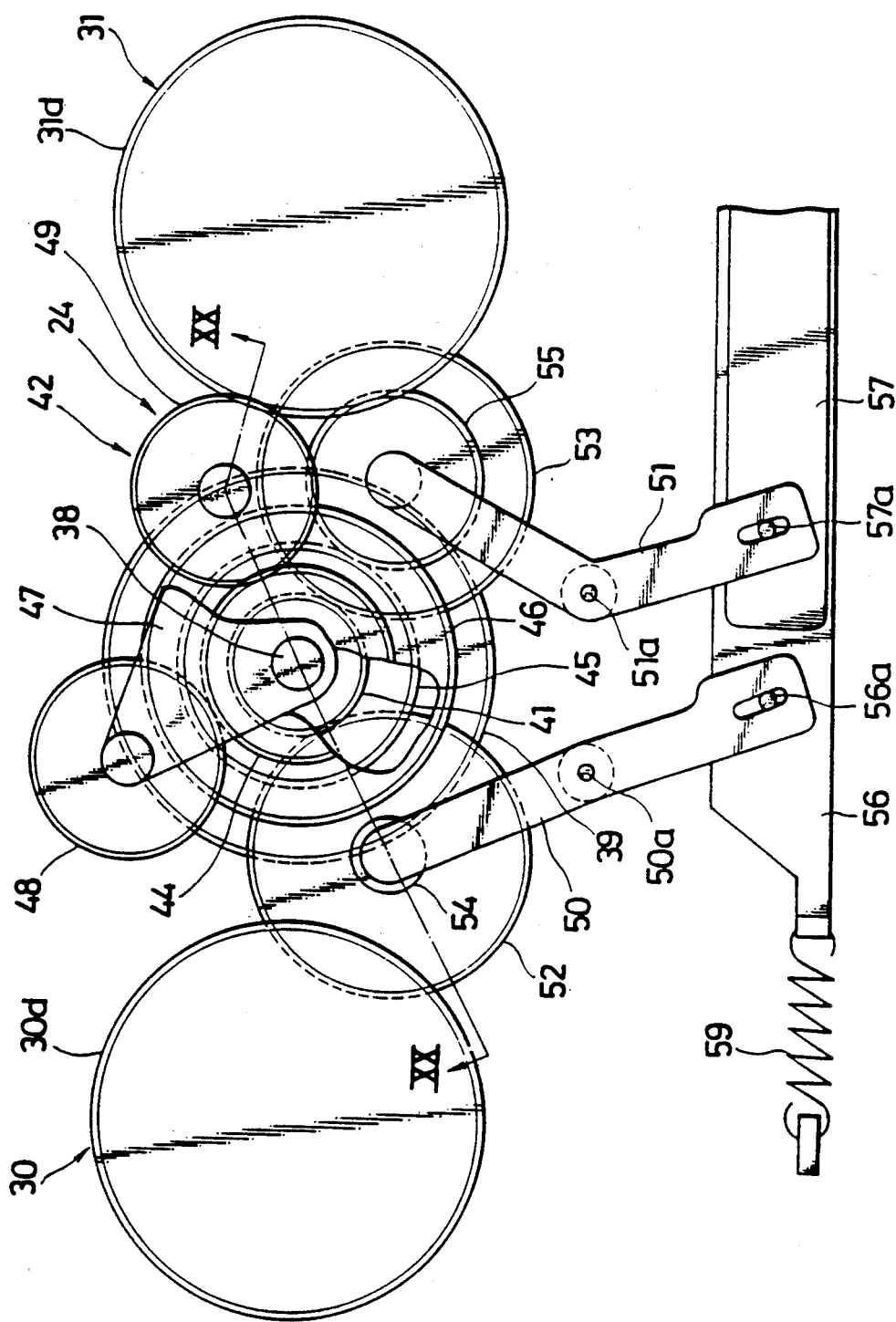
Figure 18:
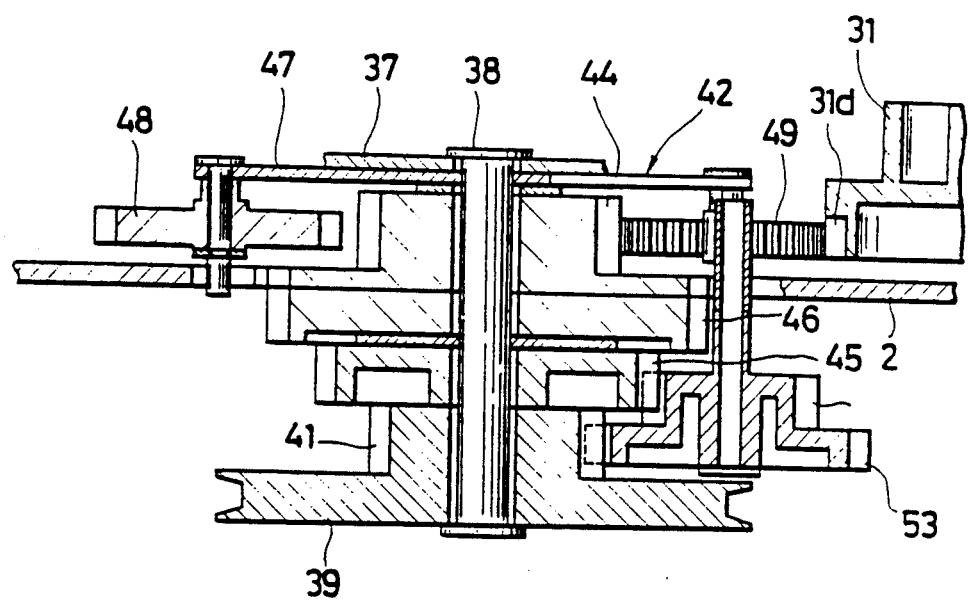
FIG. 18 is an enlarged cross sectional view taken along line XVII—XVII of FIG. 16.
Figure 19:
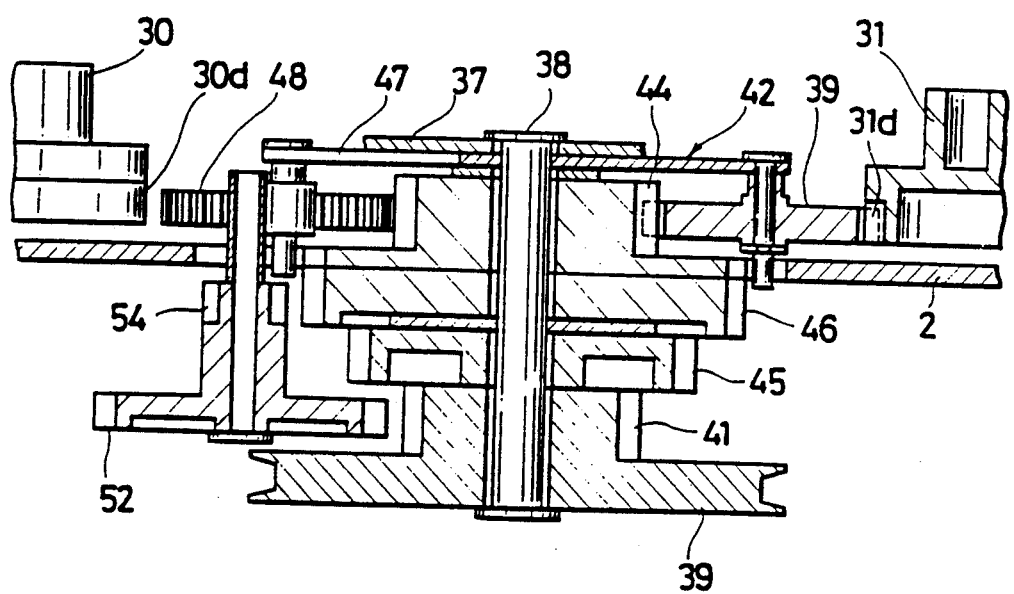
FIG. 19 is an enlarged cross sectional view taken along line XIX—XIX of FIG. 16.
Figure 20:
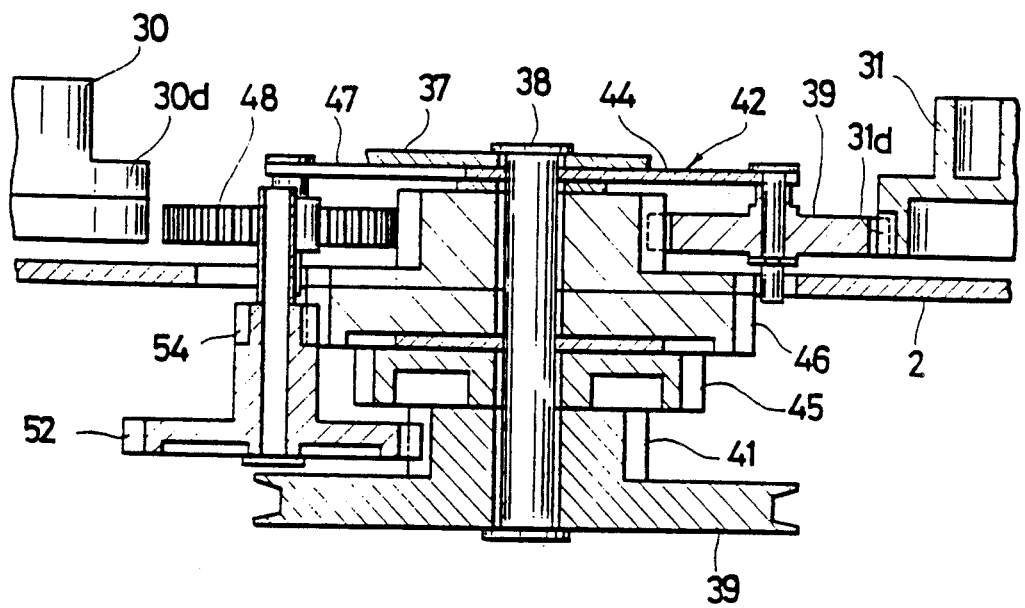
FIG. 20 is an enlarged cross sectional view taken along line XX—XX of FIG. 17.

Referring to FIGS. 16 to 20, the gear mechanism 42 includes a first gear 44 mounted for rotation on the shaft 38, a second gear 45 mounted for integral rotation with and below the first gear 44, a third or clutch gear 46 mounted for integral rotation with the first gear 44 on the shaft 38, a pivotal plate 47 fitted for back and forth pivotal motion on the shaft 38, fourth and fifth gears 48, 49 mounted for rotation on opposite ends of the pivotal plate 47, first and second pivotal levers 50, 51, a sixth low speed side gear 52 and a seventh high speed side gear 53 mounted for rotation at one ends of the first and second pivotal levers 50, 51, respectively, and eighth and ninth gears 54, 55 located in an integral relationship on upper faces of the sixth and seventh gears 52, 53, respectively. The first and second pivotal levers 50, 51 are supported substantially at central portions thereof for back and pivotal motion around pivot shaft 50a, 51a, respectively, secured to and extending between the upper face of the chassis 2 and a lower face of the sub-chassis 37. Thus, if the second pulley 39 of the third motion transmitting mechanism 29 is rotated in a counterclockwise direction in FIG. 6, the pivotal plate 47 is pivoted also in a counterclockwise direction in the same figure, that is, in a clockwise direction in FIG. 16 due to frictional contact thereof with the gear 44 so that the fourth gear 48 is moved out of meshing engagement with the gear 30d of the supply side reel base 30 while the fifth gear 49 is brought into meshing engagement with the gear 31d of the take-up side reel base 31 as shown in FIG. 16. Meanwhile, if the second pulley 39 is rotated in a clockwise direction in FIG. 6, the pivotal plate 47 is pivoted also in the clockwise direction in the same figure, that is, in the counterclockwise direction in FIG. 16 so that the fourth gear 48 is brought into meshing engagement with the gear 30d of the supply side reel base 30 while the fifth gear 49 is moved out of meshing engagement with the gear 31d of the take-up side reel base 31. Meanwhile, if the first and second pivotal levers 50, 51 are pivoted in counterclockwise directions around the shafts 50a, 51a, respectively, in FIG. 5, then the sixth and eighth gears 52, 54 do not mesh with any of the gears while the seventh gear 53 is brought into meshing engagement with the gear 41 of the second pulley 39 of the third motion transmitting mechanism 29 and the ninth gear 55 is brought into meshing engagement with the second gear 45, thereby establishing a high speed rotation transmitting condition as shown in FIG. 16. On the contrary, if the first and second pivotal levers 50, 51 are pivoted in clockwise directions in FIG. 5, the sixth gear 52 is brought into meshing engagement with the gear 41 of the second pulley 39 of the third motion transmitting mechanism 29 and the eighth gear 54 is brought into meshing engagement with the third gear 46 while the seventh and ninth gears 53, 55 are brought out of meshing engagement with the gears 41, 45, respectively, thereby establishing a low speed rotation transmitting condition as shown in FIG. 17. Here, the diameter of the eighth gear 54 is smaller than the diameter of the ninth gear 55 and the diameter of the second gear 45 is smaller than the diameter of the third gear 46.

Figure 5:
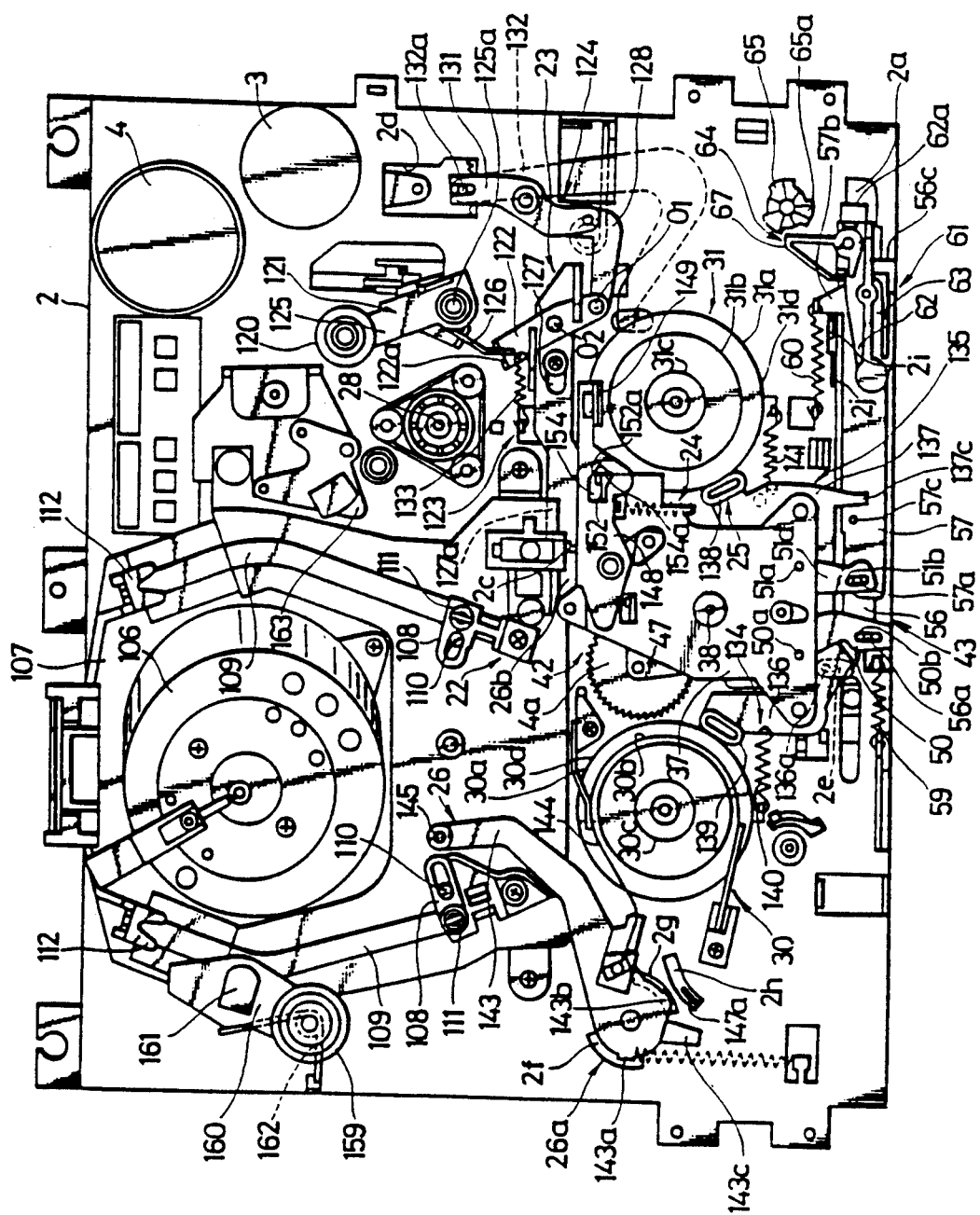
FIG. 5 is a top plan view of the device of FIG. 1 with the cassette loading mechanism removed.

Referring to FIGS. 5, 6, 16 and 17, the link mechanism 43 includes a first movable member 56 mounted for sliding movement within a predetermined range on the upper face of the chassis 2, a second movable member 57 mounted for sliding movement within a predetermined range on an upper face of the first movable member 56, and a pivotal lever 58 supported substantially at a central portion thereof for back and fourth pivotal motion within a predetermined angular range on the lower face of the chassis 2. The first and second movable members 56, 57 have engaging projections 56a, 57a securely mounted on upper faces adjacent one ends thereof, and the engaging projections 56a, 57a are received in engaging holes 50b, 51b at the other ends of the first and second levers 50, 51, respectively. Accordingly, if the first and second movable members 56, 57 are slidably moved rightwardly in FIG. 5, the first and second pivotal levers 50, 51 are pivoted in the counterclockwise directions in the same figure, thereby establishing the high speed rotation transmitting condition as shown in FIG. 16. To the contrary, if the first and second movable members 56, 57 are slidably moved leftwardly in FIG. 5, the first and second pivotal levers 50, 51 are pivoted in clockwise directions in the same figure, thereby establishing the low speed rotation transmitting condition as shown in FIG. 17. The first and second movable members 56, 57 are biased in leftward directions in FIG. 5 by coil springs 59, 60, respectively, so as to establish the low speed rotation transmitting condition. The second movable member 57 has a second engaging projection 57b formed on a side edge thereof, and the limit position of the second movable member 57 for the leftward movement in FIG. 5 is defined by a stopper 2j on the upper face of the chassis 2 with which the second engaging projection 57b is abutted. An engaging pin 56b is securely mounted on a lower face adjacent the other end of the first movable member 56 and extends downwardly through and below a hole 2a perforated in the chassis 2 until it is engaged with an engaging hole 58a of the pivotal lever 58. The pivotal lever 58 has an engaging pin 58b securely mounted on one end thereof for sliding engagement with the second cam 17 of the cam plate 7. Thus, as the cam plate 7 is rotated in a predetermined angle in the clockwise direction in FIG. 6, the first movable member 56 is moved in the direction toward the position for the low speed rotation transmitting condition (leftward direction in FIG. 5) via the pivotal lever 58 by the coil spring 59.

Figure 23A:
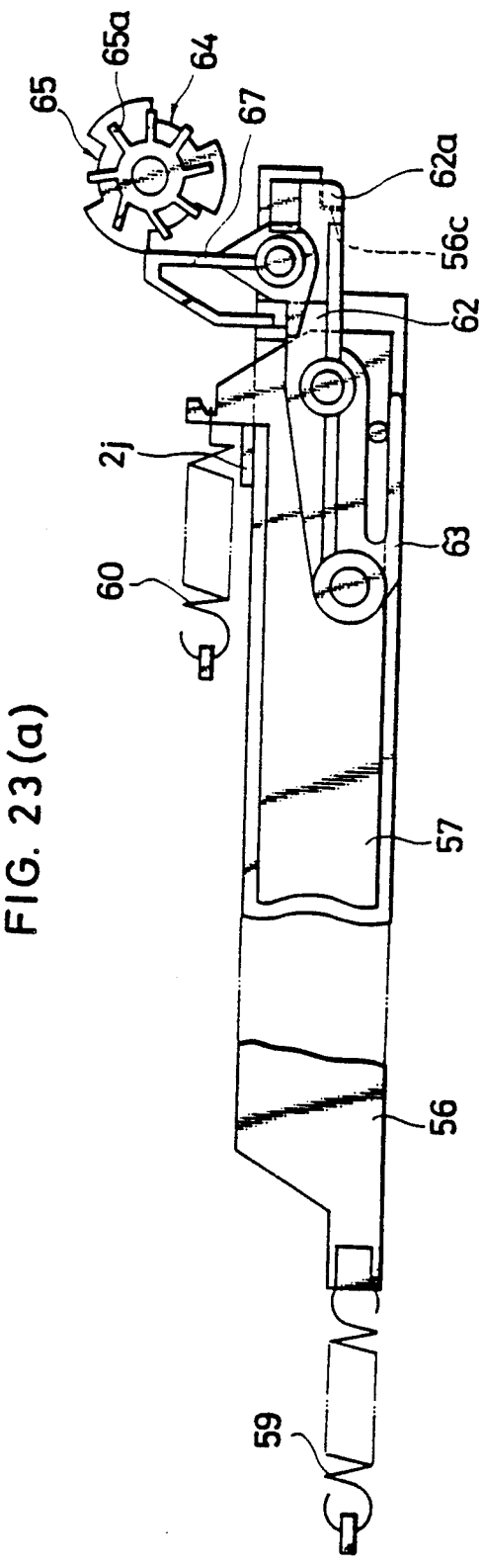
FIGS. 23a and 23b are schematic views showing different positions of a canceling mechanism of the device of FIG. 1.
Figure 23B:
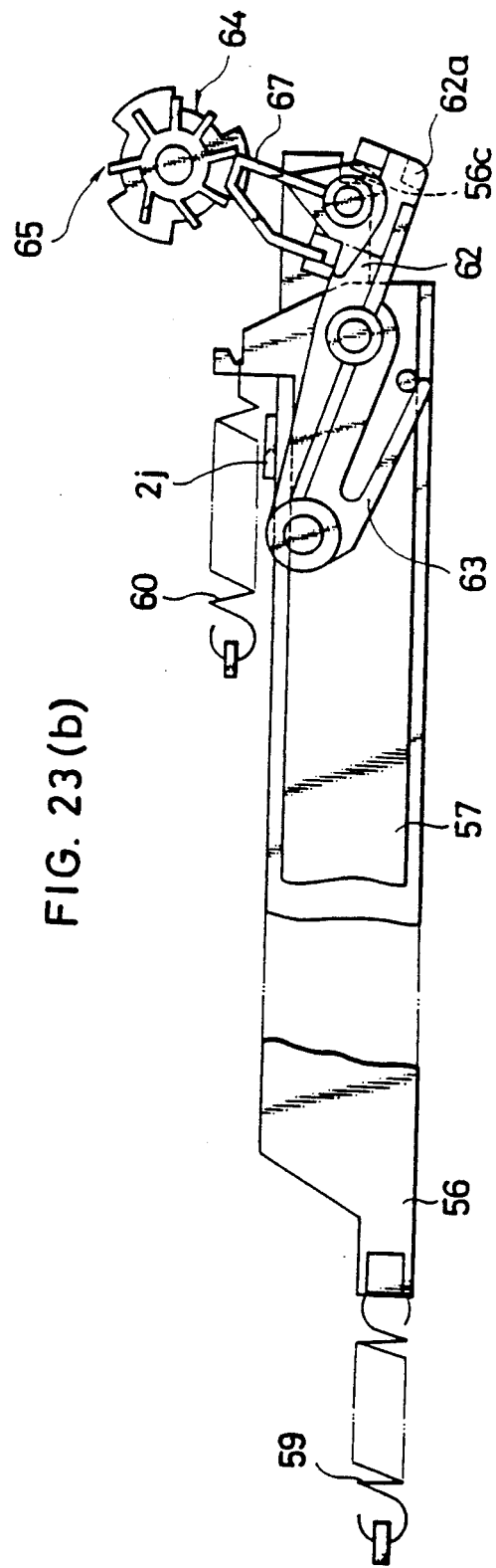

Referring to FIGS. 5, 23a and 23b, a connecting mechanism 61 is located on the upper face adjacent the other end of the first movable member 56. The connecting mechanism 61 includes a pivotal lever 62 which is supported substantially at a central portion thereof for back and forth pivotal motion within a predetermined range on the upper face of the first movable member 56 as shown in FIG. 5. An engaging projection 62a is formed projectingly on a lower face adjacent one end of the pivotal lever 62 for selective engagement with an engaging shoulder 56c formed adjacent the other end of the first movable member 56. Thus, as the engaging projection 62a is engaged with the engaging shoulder 56c, the first and second movable members 56, 57 are connected to each other and can thus be slidably moved in an integral relationship with each other. The pivotal lever 62 is normally biased in a direction to connect the first and second movable members 56, 57 by a spring 63. The connected condition of the first and second movable members 56, 57 by the connecting mechanism 61 is released by a releasing mechanism 64 when the first and second movable members 56, 57 reach their limit positions in the rightward movement in FIG. 5 during forward rotation of the cam motor 3.

The releasing mechanism 64 include a rotary member 65 supported for back and forth rotation on the upper face of the chassis 2. A plurality of engaging teeth 65a are formed in an equidistantly spaced relationship in a circumferential direction on an upper face of the rotary member 65. The rotary member 65 has a gear 66 (FIG. 6) mounted in an integral coaxial relationship therewith, and the gear 66 is held in meshing engagement with the second gear 12 of the first motion transmitting mechanism 6. Thus, when the cam motor 3 rotates forwardly, the rotary member 65 is rotated in a counterclockwise direction in FIG. 5 so that the pivotal lever 62 is pressed by the engaging teeth 65a of the rotary member 65 via an abutting member 67 mounted for pivotal motion on an upper face of the pivotal lever 62 and is thus pivoted in the releasing direction (clockwise direction in FIG. 5) against the biasing force of the spring 63 to move the engaging projection 62a thereof out of engagement with the engaging shoulder 56c of the first movable member 56, thereby establishing a connection releasing condition. To the contrary, upon reverse rotation of the cam motor 3, the rotary member 65 is rotated in a clockwise direction in FIG. 5 so that the engaging teeth 65a thereof are only slidably contacted with the abutting member 67 and the pivotal lever 62 is not pivoted in the releasing direction. Accordingly, the connecting condition is maintained.

Figure 2:
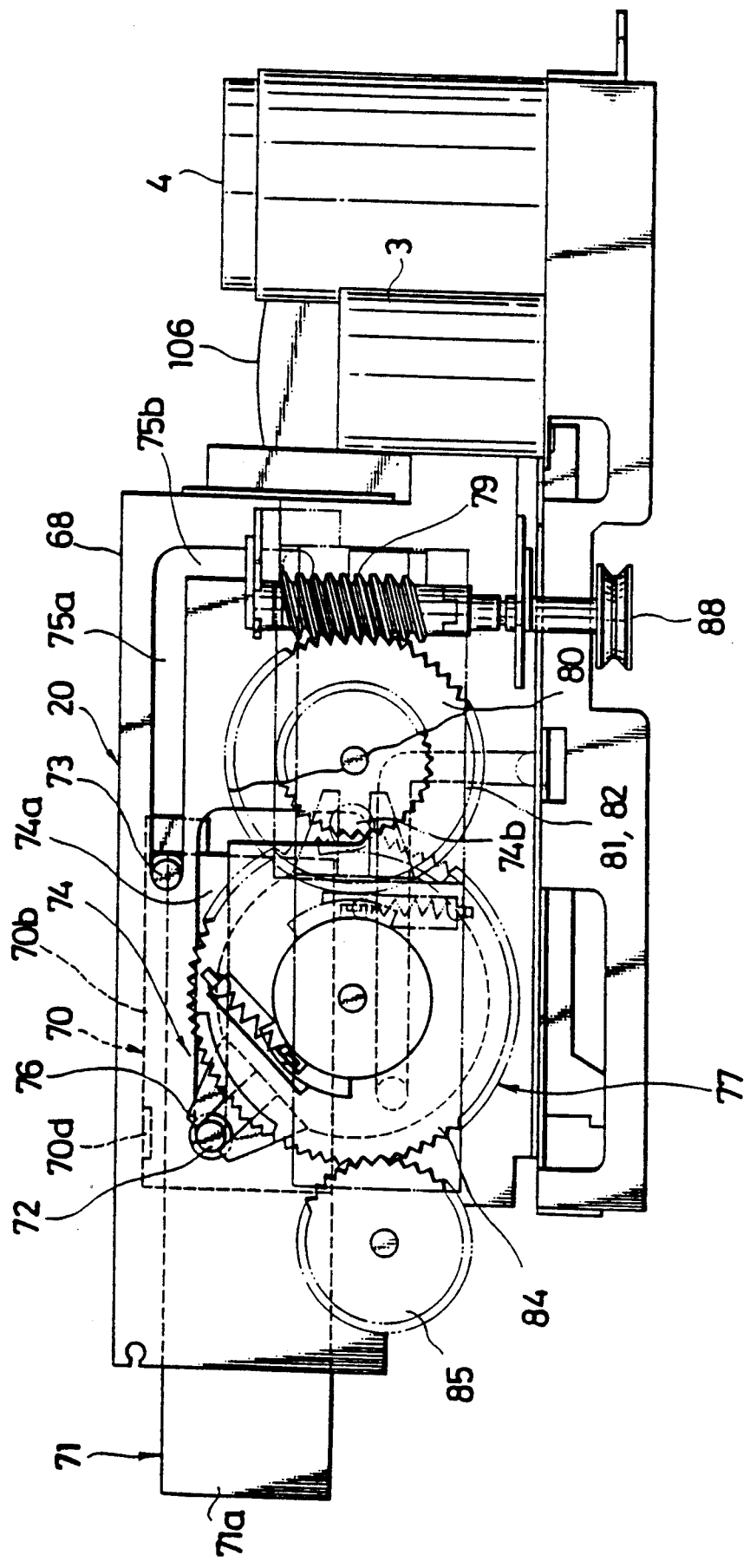
FIG. 2 is a side elevational view taken along line II—II of FIG. 1.
Figure 3:
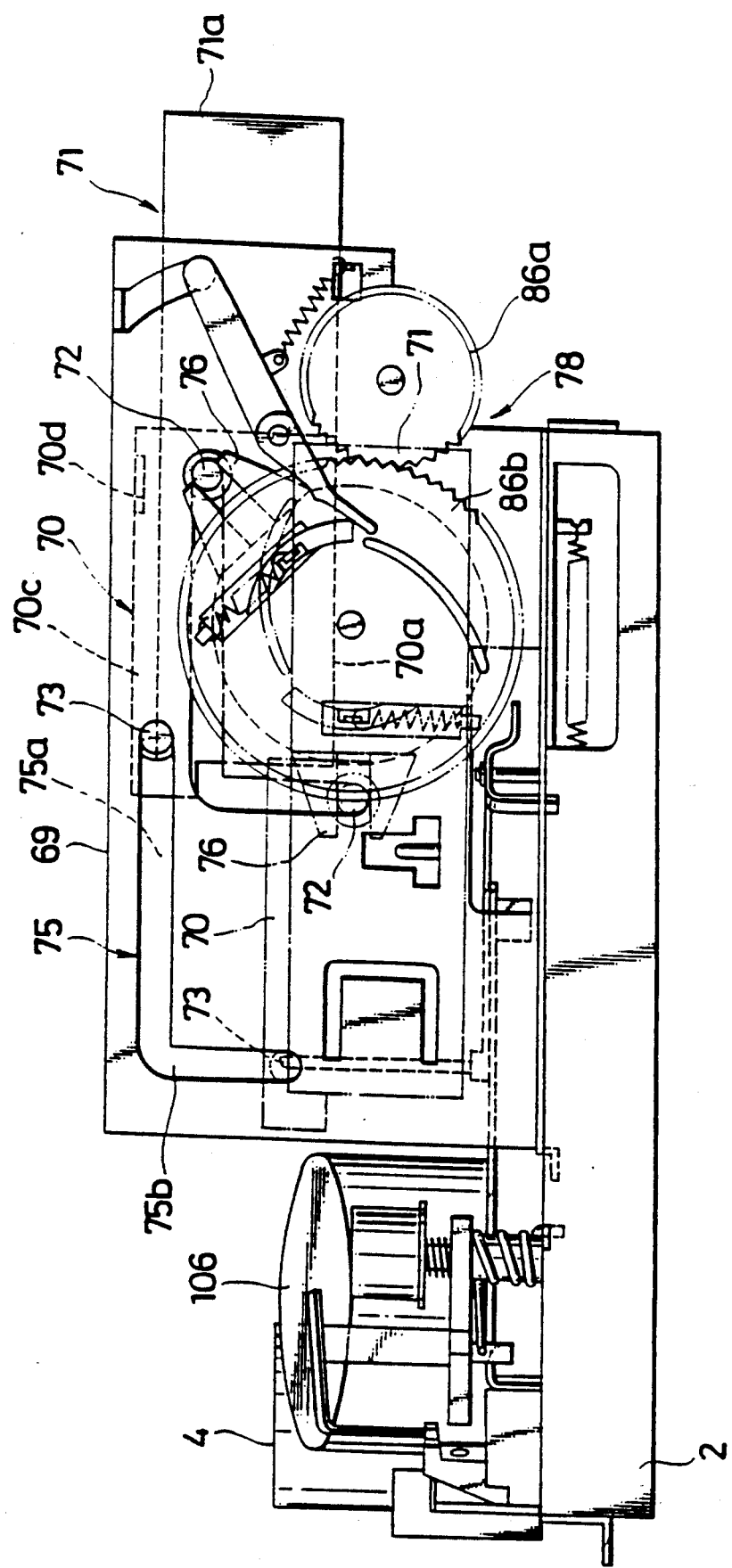
FIG. 3 is a side elevational view taken along line III—III of FIG. 1.
Figure 4:
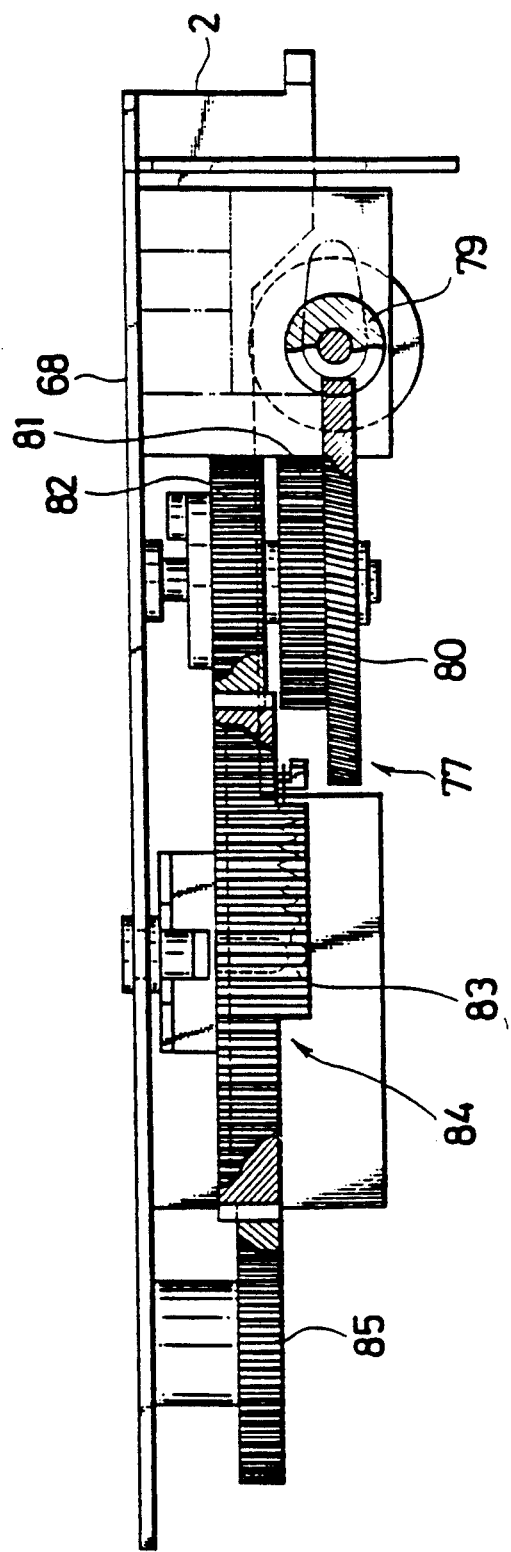
FIG. 4 is a somewhat enlarged plan view, partly broken, of a motion transmitting mechanism of a cassette loading mechanism of the device of FIG. 1.

Referring now to FIGS. 1 to 3, the cassette loading mechanism 20 is constituted such that, upon insertion of a cassette 71 to a predetermined position within a cassette housing or cassette receiving section 70, it moves the cassette 71 to a loaded position in which the cassette 71 is fitted on reel shafts 30c, 31c of the supply and take-up side reel bases 30, 31, and upon manual operation of an ejecting mode setting operating member not shown, it moves the cassette 71 from the loaded position to a discharged position outside the cassette housing 70. The cassette housing 70 is mounted for sliding movement in a back and forth direction, that is, in a vertical direction in FIG. 1 and also in an up and down direction between a pair of side plates 68, 69 which are mounted uprightly at opposite locations of the chassis 2 forwardly of a substantially central portion in the back and forth direction of the chassis 2. Meanwhile, the cassette housing 70 includes a pair of side plates 70b, 70c erected uprightly on opposite sides of a bottom plate 70a on which the cassette 71 can be placed, and a connecting bar 70d interconnects the side plates 70b, 70c. The cassette housing 70 is supported on and between the side walls 68, 69 by means of two pairs of guide pins 72, 73 which are securely mounted at forward and rearward locations of the side plates 70b, 70c, respectively, of the cassette housing 70 and are slidably received in a pair of elongated guide holes 74, 75, respectively, formed in a juxtaposed relationship at forward and rearward locations of the side plate 68, 69. The guide holes 74, 75 include horizontal hole portions 74a, 75a and vertical hole portions 74b, 75b extending in a contiguous relationship downwardly from rear end portions of the horizontal hole portions 74a, 75a, respectively, and have a substantially inverted L-shape. A pair of motion transmitting gear mechanisms 77, 78 are connected to the guide pins 72 at the front portions of the side plates 70b, 70c of the cassette housing 70 by way of a pair of forks 76. The motion transmitting gear mechanism 77 on the side plate 68 side (right-hand side in FIG. 1) is located on an outer side face of the side plate 68. Referring also to FIG. 4, the motion transmitting gear mechanism 77 includes a worm 79, a worm wheel 80 held in meshing engagement with the worm 79, first and second gears 81 and 82 mounted for coaxial rotation with the worm wheel 80, a fourth gear 84 held in meshing engagement with the second gear 82 and having formed in an integral relationship thereon a thicker gear portion 83 which extends over a predetermined angular range along an outer periphery of the fourth gear 84 for meshing engagement with the first gear 81, and a fifth gear 85 held in meshing engagement with the fourth gear 84.

The fourth gear 84 is connected to the guide pin 72 on the front side of the side plate 68 by way of the fork 76. Meanwhile, the motion transmitting gear mechanism 78 on the other side plate 69 side (left-hand side in FIG. 1) is located on an outer side face of the other side plate 69. The other motion transmitting gear mechanism 78 includes a first gear 86a for integral coaxial rotation with the fifth gear 85 of the motion transmitting gear mechanism 77, and a second gear 86b held in meshing engagement with the first gear 86a. The second gear 86b is connected to the guide pin 72 on the front side of the other side plate 69 by way of the fork 76. Thus, if the cassette 71 is fitted into the cassette housing 70 and inserted in a predetermined condition to a position as shown in solid lines in FIGS. 2 and 3, a detecting switch (not shown) detects such insertion to start driving rotation of the capstan motor 4. The turning force of the capstan motor 4 is transmitted to the motion transmitting gear mechanism 77 and the other motion transmitting gear mechanism 78 via the second motion transmitting mechanism 27 (FIG. 6), the turning force transmission change-over mechanism 21 and a fourth motion transmitting mechanism 87 which will both be hereinafter described. Consequently, the cassette housing 70 is moved together with the cassette 71 first horizontally inwardly from a position shown in broken lines in FIGS. 2 and 3 under the guidance of the horizontal hole portions 74a, 75a of the guide holes 74, 75 and then vertically downwardly under the guidance of the vertical hole portions 74b, 75b until the cassette 71 is brought to the loaded position as shown in chain lines in FIGS. 2 and 3. In the loaded position, the reel shafts 30c, 31c of the supply side reel base 30 and the take-up side reel base 31 are fitted in central fitting holes (not shown) of a supply side tape reel and a take-up side tape reel (not shown, either) accommodated in a case 71a of the cassette 71. A lid not shown mounted for opening and closing movement at an opening face at a rear end of the case 71a of the cassette 71 is open in the loaded position of the cassette 71. Further, in the loaded position of the cassette 71, an inclined tape guide pole, a vertical tape guide pole which will both be hereinafter described and the capstan 28 are relatively fitted in the case 71a at respective positions inside a loop of a tape through cutaway holes not shown formed in a bottom wall of the case 71a.

Figure 12:
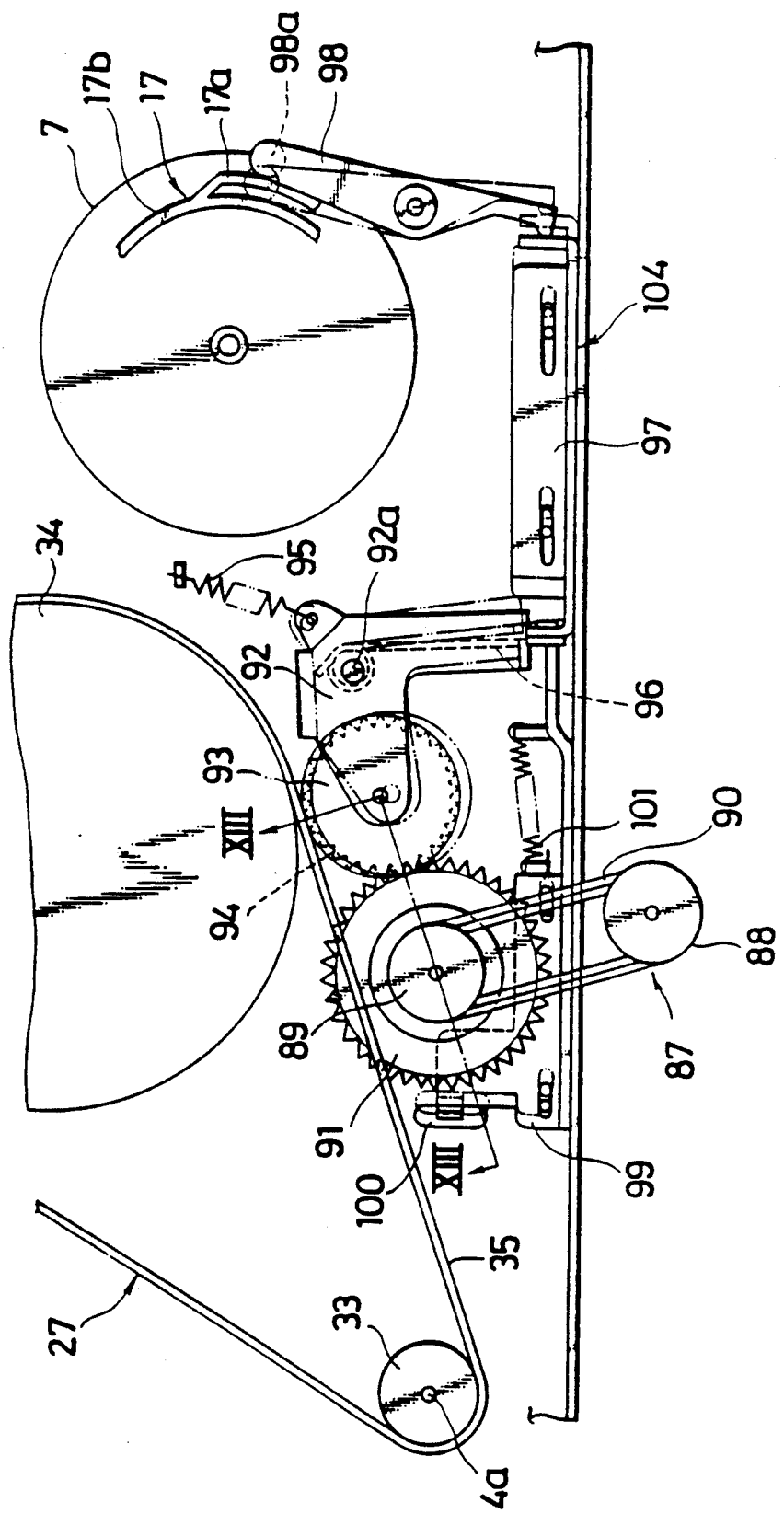
FIG. 12 is a schematic illustration showing a turning force transmission change-over mechanism of the device of FIG. 1.

Referring to FIGS. 6 and 12, the fourth motion transmitting mechanism 87 includes a first pulley 88 with a V-shaped peripheral groove securely mounted at a lower end of the worm 79 of the motion transmitting gear mechanism 77, a second pulley 89 with a V-shaped peripheral groove supported for rotation on the lower face of the chassis 2, an endless belt 90 extending between the pulleys 88, 89, and a gear 91 formed in an integral relationship on the upper face of the second pulley 89.

Figure 13:
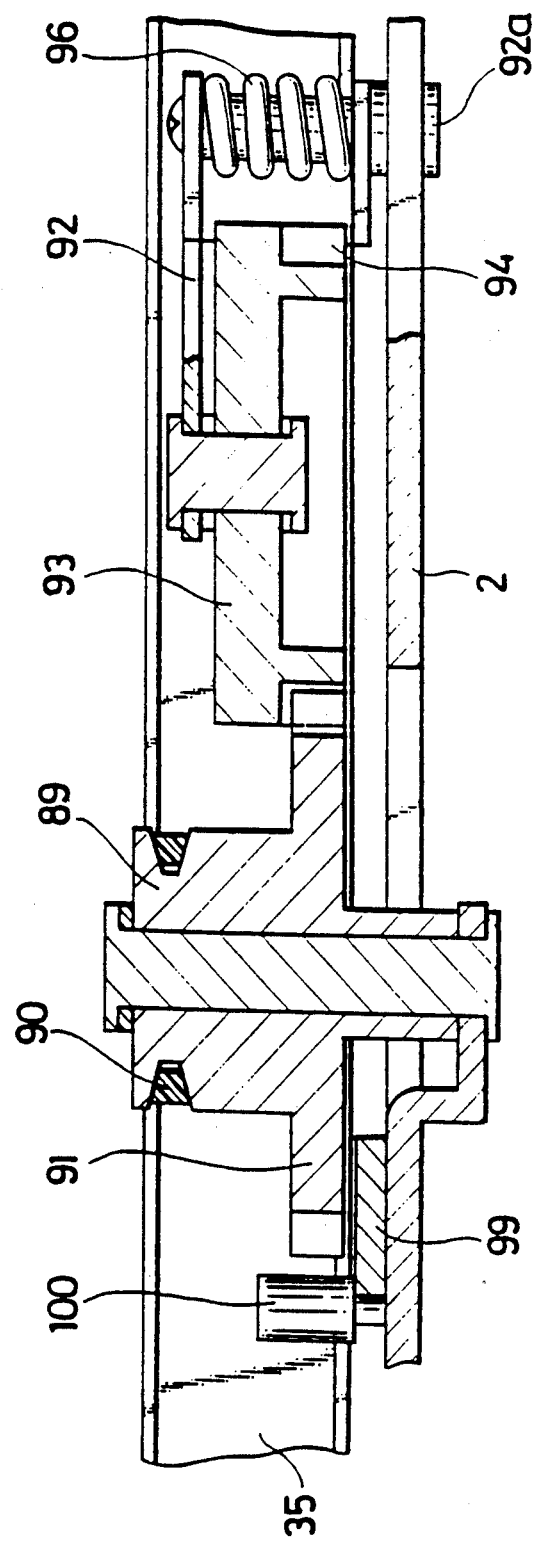
FIG. 13 is a cross sectional view, in an enlarged scale, taken along line XIII—XIII of FIG. 12.

Referring also to FIG. 13, the endless belt 90 is in the form of an angular belt made of a rubber material and having a substantially square cross section. The gear 91 is connected to the turning force transmission change-over mechanism 21.

The turning force transmission change-over mechanism 21 has a movable member 92 supported for pivotal motion within a predetermined angular range on the lower face of the chassis 2. The movable member 92 has a substantially L-shape in plan and is supported substantially at a central portion thereof for rotation on the lower face of the chassis 2. A pinch roller 93 is supported for rotation at an end portion of the movable member 92. A gear 94 is formed in an integral relationship on an upper face of the pinch roller 93 and is normally held in meshing engagement with the gear 91 of the fourth motion transmitting mechanism 87. The pinch roller 93 is movable from and to a position in which it is contacted at a circumferential side face thereof with an outer periphery of the endless belt 35 of the second motion transmitting mechanism 27 and is thus rotated by the endless belt 35. The movable member 92 is normally biased in a counterclockwise direction in FIGS. 6 and 12 so as to move the pinch roller 93 away from the endless belt 35 by a coil spring 95. The coil spring 95 is secured at one end thereof to the movable member 92 and at the other end thereof to the lower face of the chassis 2. The movable member 92 is connected to a torsion coil spring 96 which exerts a biasing force to press the pinch roller 93 against the endless belt 35 when the movable member 92 is pivoted in a direction so as to bring the circumferential side face of the pinch roller 93 into contact with the endless belt 35 against the biasing force of the coil spring 95. The torsion coil spring 96 has a central coiled portion fitted around a pivotal shaft 92a of the movable member 92 and has one end portion thereof engaged with a portion adjacent one end of the movable member 92 and the other end portion thereof engaged with another portion adjacent the other end of the movable member 92. The other end portion of the torsion coil spring 96 is connected to the second cam 17 of the cam plate 7 by way of a link mechanism 104. The link mechanism 104 includes a slide lever 97 and a pivotal lever 98. The slide lever 97 is abutted at one end thereof with the other end of the torsion coil spring 96. The slide lever 97 is mounted for sliding movement within a predetermined range on the lower face of the chassis 2. The pivotal lever 98 is abutted at one end thereof with the other end of the slide lever 97. The pivotal lever 98 is supported substantially at a central portion thereof for pivotal motion within a predetermined angular range on the lower face of the chassis 2. An engaging pin 98a is formed at the other end of the pivotal lever 98 for engagement with the second cam 17 of the cam plate 7. Thus, as the cam plate 7 is rotated, the movable member 92 is pivoted thereby in a controlled manner via the pivotal lever 98 and the slide lever 97. A brake lever 99 is mounted for sliding movement within a predetermined range on the lower face of the chassis 2 and located in a serial contiguous relationship to the one end portion of the slide lever 97. The brake lever 99 is designed to keep the cassette loading mechanism 20 in a locked condition so that the cassette loading mechanism 20 may not operate in error after it has completed its cassette loading operation. A brake shoe 100 made of a rubber material or the like is mounted at an end of the brake lever 99, and as the brake lever 99 is slidably moved, the brake shoe 100 is moved into or out of contact with the gear 91 of the fourth motion transmitting mechanism 87. When the brake shoe 100 is held in contact with the gear 91, a braking force is applied to the gear 91, thereby establishing the locked condition of the cassette loading mechanism 20. The brake lever 99 is normally biased in a direction toward the slide lever 97 so as to contact the brake shoe 100 with the gear 91 by a coil spring 101. Thus, as the slide lever 97 is slidably moved toward the brake lever 99, the pivotal member 92 is pivoted to contact the pinch roller 93 with the endless belt 35 while at the same time the brake lever 99 is pushed by the slide lever 97 to move in a direction away from the slide lever 97 against the biasing force of the coil spring 101 so that the brake shoe 100 is moved away from the gear 91 to cancel the braking action thereof, thereby establishing an unlocked condition.

Figure 14:
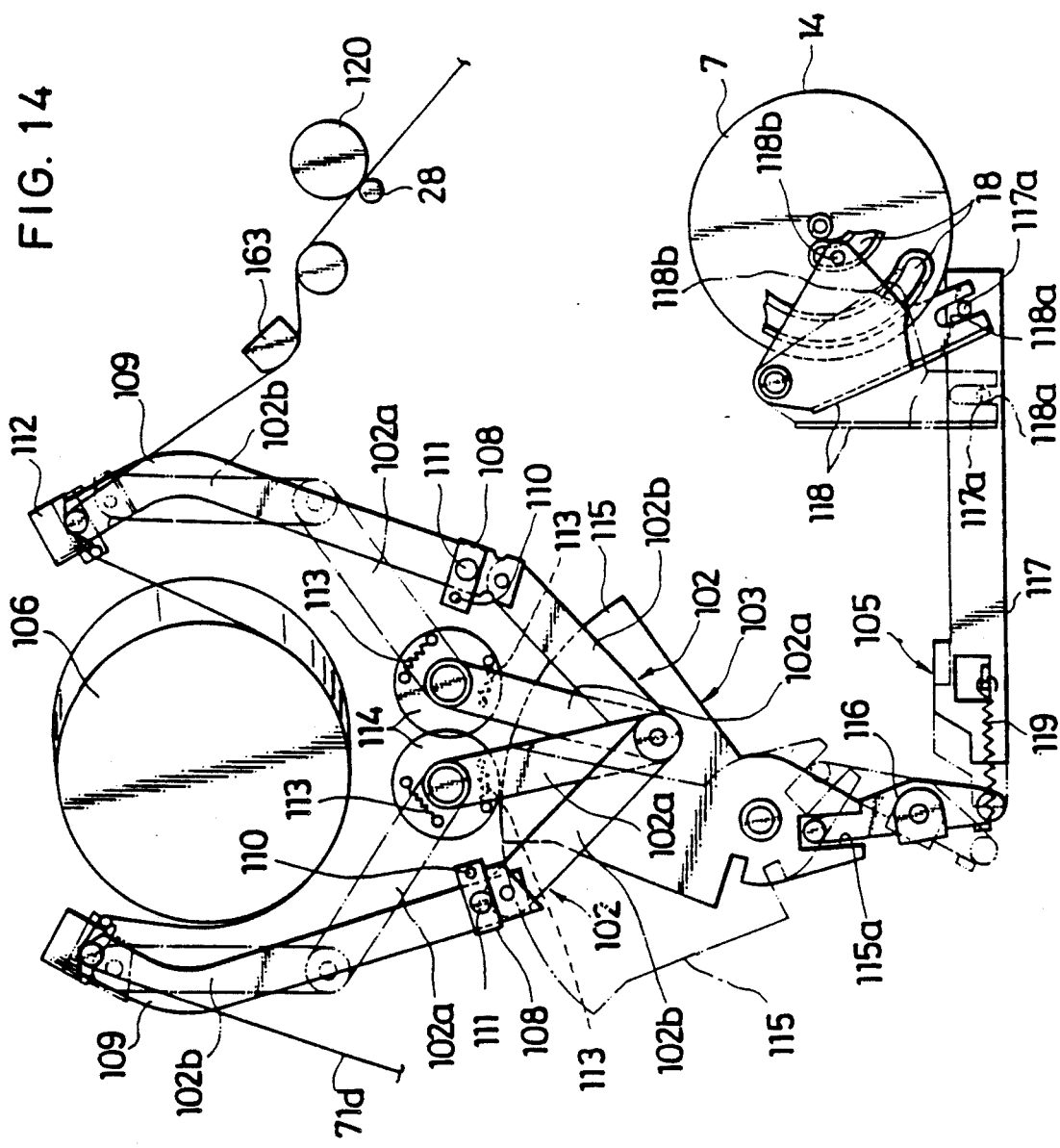
FIG. 14 is a schematic illustration showing operation of the tape loading mechanism of the device of FIG. 1.

Referring to FIGS. 5, 6 and 14, the tape loading mechanism 22 is designed so as to draw out a magnetic tape 71d from within the case 71a of the cassette 71 in the loaded position and cause it to extend over a predetermined angular range on an outer circumferential face of a guide cylinder 106 which has a head not shown thereon. The tape loading mechanism 22 includes a pair of loading arms 102, a gear mechanism 103 for operating the loading arms 102, and a link mechanism 105 for operatively connecting the gear mechanism 103 to the third cam 18 of the cam plate 7. The loading arms 102 each includes a first arm member 102a and a second arm member 102b connected for pivotal motion to an end of the first arm 102a. The first arm members 102a are supported at the other ends thereof for back and forth pivotal motion within a predetermined angular range on a lower face of a sub-chassis 107 mounted on the chassis 2 in a spaced relationship above and near the guide cylinder 106. A leading guide block 108 is securely mounted at the other end of each of the second arm members 102b, and the leading guide blocks 108 are engaged for sliding movement in a pair of guide holes 109 of a predetermined shape formed in the sub-chassis 107 at locations on opposite sides of the guide cylinder 106. An inclined pole 110 and a vertical pole 111 for guiding a tape therealong are implanted on an upper face of each of the leading guide blocks 108. The inclined poles 110 and vertical poles 111 extend upwardly through the guide holes 109 above the sub-chassis 107. A stopper 112 is located at an end of each of the guide holes 109. Meanwhile, the gear mechanism 103 includes a pair of mutually meshing gears 114 mounted for synchronized rotation at the other ends of the first arm members 102a via springs 113, and a sector gear 115 held in meshing engagement with one of the gears 114. The sector gear 115 is supported for back and forth rotation within a predetermined angular range on the lower face of the chassis 2.

The link mechanism 105 includes a first pivotal lever 116, a slide lever 117, and a second pivotal lever 118. The first pivotal lever 116 is engaged at one end thereof in a recess 115a of the sector gear 115 and is supported substantially at a central portion thereof for pivotal motion within a predetermined angular range on the lower face of the chassis 2. The first pivotal lever 116 has an engaging lug 116a formed at a substantially central portion of a longitudinal edge thereof. The engaging lug 116a of the first pivotal lever 116 is engaged for sliding movement in an arcuate guide hole 2b perforated in the chassis 2 and having a predetermined angular extent so that the first pivotal lever 116 may be pivoted back and forth only within a range of the angular extent of the guide hole 2b. The other end of the first pivotal lever 116 is located in an opposing relationship to one end of the slide lever 117 and connected to the slide lever 117 by a coil spring 119. The slide lever 117 is mounted for sliding movement within a predetermined range on the lower face of the chassis 2. A pin 117a is securely mounted at a location adjacent the other end of the slide lever 117 and is engaged in a recess 118a formed at an end of the second pivotal lever 118. The pivotal lever 118 is supported at the other end thereof for back and forth pivotal motion within a predetermined angular range on the lower face of the chassis 2. An engaging pin 118b is securely mounted at a substantially central portion of one side of the second pivotal lever 118 and is engaged for sliding movement with the third cam 18 of the cam plate 7. Thus, as the cam plate 7 is rotated by a predetermined angle in one direction (counterclockwise direction in FIG. 6), the sector gear 115 is pivoted in the counterclockwise direction in FIG. 6 toward its unloading position by way of the second lever 118, slide lever 117 and first pivotal lever 116 so that both of the loading arms 102 are brought into a compressed condition in which the leading guide blocks 108 thereof are located adjacent base ends of the guide holes 109 as shown in solid lines in FIG. 14. To the contrary, if the cam plate 7 is rotated by the predetermined angle in the other direction (clockwise direction in FIG. 6) from the position described above, the sector gear 115 is pivoted toward its loading position (in the clockwise direction in FIG. 6) so that both of the loading arms 102 are brought into an extended condition in which the leading guide blocks 108 thereof are stopped by the stoppers 112 as shown in two-dot chain lines in FIG. 14.

Figure 15:
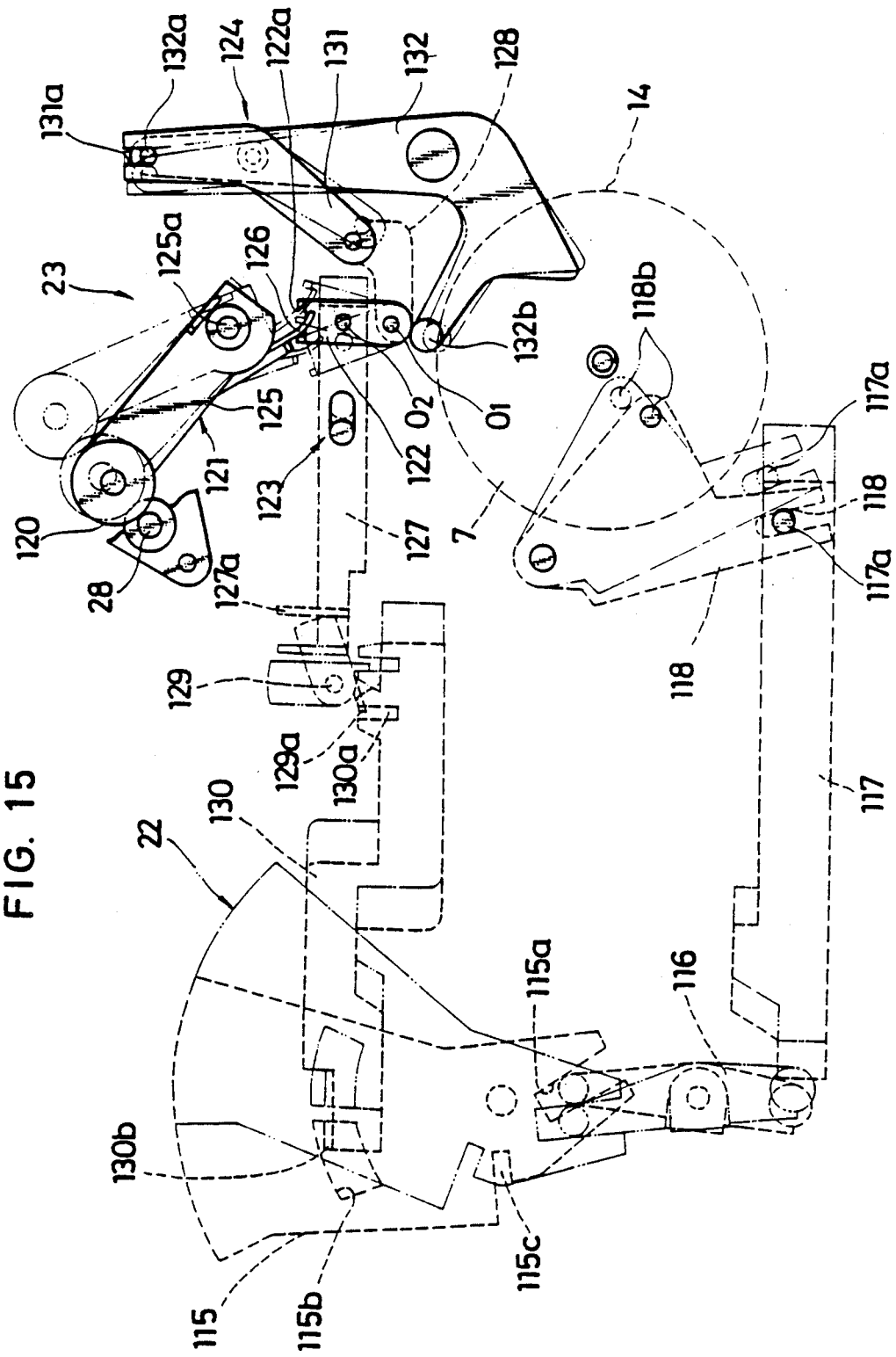
FIG. 15 is a schematic illustration showing of operation of a pinch roller driving mechanism of the device of FIG. 1.

Referring to FIGS. 5, 6 and 15, the pinch roller driving mechanism 23 includes a pinch roller supporting mechanism 121 having a pinch roller 120 supported for rotation thereon, a link member 122, a first transmitting mechanism 123 for rapidly moving the pinch roller 120 toward the capstan 28, and a second transmitting mechanism 124 for pressing the pinch roller 120 strongly against the capstan 28. The pinch roller supporting mechanism 121 includes a pivotal member 125 supported for back and forth pivotal motion within a predetermined angular range on the upper face of the chassis 2, and a torsion coil spring 126 incorporated in the pivotal member 125. The pinch roller 120 is supported for rotation at the other end of the pivotal member 125. The torsion coil spring 126 is anchored at one end thereof to an anchoring hole not shown of the pivotal member 125, fitted at a central coiled portion thereof on a pivot shaft 125a of the pivotal member 125, and engaged at the other end thereof in a recess 122a at one end of the link member 122. The link member 122 is connected substantially at a central portion thereof for pivotal motion within a predetermined angular range to one end portion of a first slide member 127 of the first transmitting mechanism 123 and is connected at the other end thereof for pivotal motion to one end of a connecting arm 128 of the second transmitting mechanism 124. A connecting point between the link member 122 and the connecting arm 128 serves as a first point $O_1$ of application while a connecting point between the link member 122 and the first slide member 127 serves as a second point $O_2$ of application. The first transmitting mechanism 123 includes the first slide member 127 mounted for sliding movement within a predetermined range on the upper face of the chassis 2, a pivotal member 129 supported for pivotal motion within a predetermined angular range on the lower face of the chassis 2, and a second slide member 130 mounted for sliding movement within a predetermined range on the lower face of the chassis 2. An engaging projection 127a is formed at the other end of the first slide member 127 and extends downwardly below the chassis 2 through a hole 2c of the chassis 2 until it is abutted and engaged with the pivotal member 129. Thus, the first slide member 127 is movable within a range of the hole 2c of the chassis 2 in which the engaging projection 127a thereof is fitted. Another engaging projection 129a is provided on the pivotal member 129 and is engaged in a recess 130a formed adjacent the other end of the second slide member 130. A further engaging projection 130b is formed at the other end of the second slide member 130 and is engaged in an engaging hole 115b of the sector gear 115 of the gear mechanism 103 of the tape loading mechanism 22. When the sector gear 115 is in its unloading position, the engaging projection 130b at the other end of the second slide member 130 is abutted with one end face of the engaging hole 115b of the sector gear 115. Thus, as the sector gear 115 is pivoted by a predetermined angle in the clockwise direction in FIG. 6 toward the loading side, the engaging projection 130b at the other end of the second slide member 130 is soon engaged and then pushed by the other end face of the engaging hole 115b of the sector gear 115 so that the second slide member 130 is slidably moved in a rightward direction in FIG. 6 by the sector gear 115 until loading is completed. As the second slide member 130 is slidably moved in this manner, the pivotal member 129 is pivoted in a counterclockwise direction in FIG. 6 so that the first slide member 127 is pushed and slidably moved in a rightward direction in FIG. 5 by the pivotal member 129. Upon the sliding movement of the first slide member 127, the link member 122 is pivoted in a clockwise direction in FIG. 5 while displacing the second point $O_2$ of application rightwardly in FIG. 5 without displacing the first point $O_1$ of application so that the pinch roller supporting mechanism 121 is pivoted rapidly in a counterclockwise direction in FIG. 5 to move the pinch roller 120 rapidly toward the capstan 28 until a position is reached at which a slight gap is left therebetween.

The second transmitting mechanism 124 includes the connecting arm 128, a first pivotal arm 131, and a second pivotal arm 132. The connecting arm 128 is connected at one end thereof for pivotal motion to the other end of the link member 122 and at the other end thereof for pivotal motion to one end of the first pivotal arm 131. The first pivotal arm 131 is supported at a substantially central portion thereof for pivotal motion on the upper face of the chassis 2. An engaging projection 132a is securely mounted at a location on the second pivotal arm 132 adjacent one end of the latter and extends through a hole 2d of the chassis 2 and upwardly above the upper face of the chassis 2 until it is engaged in a recess 131a formed at the other end of the first pivotal arm 131. The second pivotal arm 132 has a substantially L-shape and is supported substantially at a central portion thereof for pivotal motion within a predetermined range on the lower face of the chassis 2. An engaging pin 132b is formed at the other end of the second pivotal arm 132 for engagement with the first cam 15 of the cam plate 7. Thus, as the cam plate 7 is rotated by the predetermined angle in the clockwise direction in FIG. 6, the link member 122 is pivoted in the clockwise direction in FIG. 5 by way of the second pivotal arm 132, first pivotal arm 131 and connecting arm 128, displacing the first point $O_1$ of application leftwardly in FIG. 5 without displacing the second point $O_2$ of application so that the pinch roller supporting mechanism 121 is pivoted in the counterclockwise direction in FIG. 5 to press the pinch roller 120 strongly against the capstan 28. The link member 122 is normally biased in the counterclockwise direction in FIG. 5, that is, in a direction to move the pinch roller 120 away from the capstan 28, by a coil spring 133.

The brake mechanism 25 is designed so as to apply a brake force to the supply side reel base 30 and the take-up side reel base 31. Referring to FIGS. 5, 21a to 21c and 22a and 22b, the brake mechanism 25 includes a supply side brake member 134 and a take-up side brake member 135. Each of the brake members 134, 135 includes a brake shoe 139, 138 made of a rubber material and mounted at one end of an arm 136, 137, respectively. The arms 136, 137 are supported at substantially central portions thereof for back and forth pivotal motion within a predetermined angular range on the upper face of the chassis 2 and the lower face of the sub-chassis 37, respectively.

The arm 136 of the supply side brake member 134 has first and second engaging portions 136a, 136b at the other end thereof. Meanwhile, the arm 137 of the take-up side brake member 135 has a first engaging portion 137a at a lower face adjacent one end thereof and second and third engaging portions 137b, 137c at the other end thereof.

Figure 21:
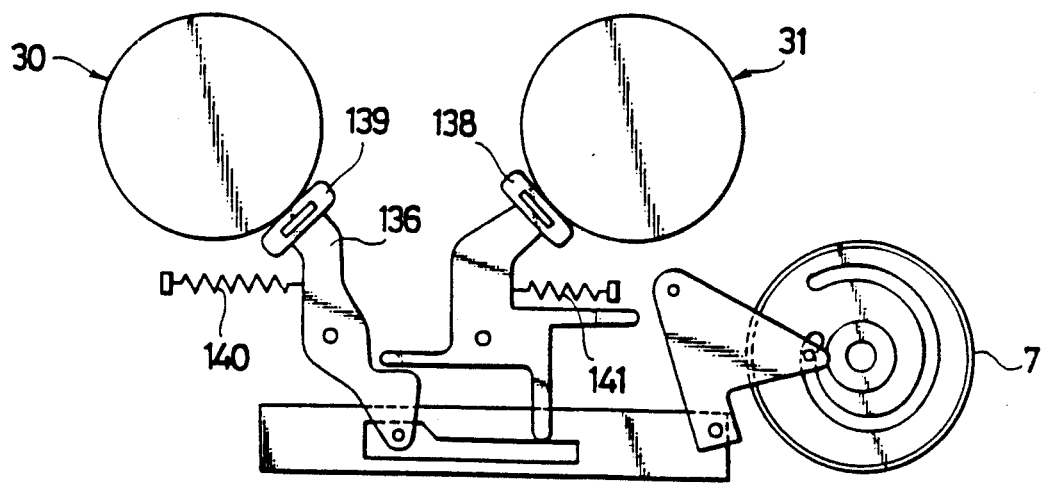
FIGS. 21a, 21b and 21c are schematic illustrations showing different positions of a brake mechanism of the device of FIG. 1 when the device is in the reproducing mode or in the rewinding mode.

The brake shoes 139, 138 of the brake members 134, 135 are individually brought into or out of contact with the larger diameter circumferential side faces 30a, 31a of the reel bases 30, 31, respectively, and when they are contacted with each other, a braking condition is established in which a braking force is applied to the reel base 30 or 31. When the take-up side brake member 135 is pivoted in a non-braking direction, that is, in a counterclockwise direction in FIG. 5 from its braking position as shown in FIG. 21a, the second engaging portion 137b of the arm 137 thereof is engaged with the second engaging portion 136b of the arm 136 of the supply side brake member 134 to pivot the supply side brake member 135 in a non-braking direction, that is, in a clockwise direction in FIG. 5 from its braking position as shown in FIG. 21a. The brake members 134, 135 are normally biased to pivot in their respective braking directions by coil springs 140, 141, respectively. The coil springs 140, 141 are secured at one ends thereof to the arms 136, 137 of the brake members 134, 135 and at the other ends thereof to the upper face of the chassis 2. The first engaging portion 136a of the arm 136 of the supply side brake member 134 extends through a hole 2e perforated in the chassis 2 and is engaged for sliding movement in an engaging hole 142 of the slide lever 117 of the link mechanism 105 of the tape loading mechanism 22. The engaging hole 142 consists of a major axis reduced width portion 142a and a minor axis increased width portion 142c connected in a contiguous relationship to one end of the major axis reduced width portion 142a via an inclined edge 142b of the slide lever 117. Thus, when the first engaging portion 136a of the arm 136 of the supply side brake member 134 is positioned in the reduced width portion 142a of the engaging hole 142, the supply side brake member 134 is in its non-braking position. To the contrary, when the first engaging portion 136a of the arm 136 of the supply side brake member 134 is positioned in the increased width portion 142c of the engaging hole 142, the supply side brake member 134 is in its braking position. The first engaging portion 137a of the arm 137 of the take-up side brake member 135 extends through a hole not shown formed in the chasses 2 and downwardly below the chassis 2, and one side face of the second pivotal lever 118 of the link mechanism 105 of the tape loading mechanism 22 is brought into or out of contact with such an extended end portion of the first engaging portion 137a of the arm 137. As the second pivotal lever 118 is contacted with and presses against the first engaging portion 137a of the arm 137, the take-up side brake member 135 is pivoted in its non-braking direction by the former. The third engaging portion 137c of the arm 137 of the take-up side brake member 135 is located for engagement with a third engaging projection 57c on an upper face of the second movable member 57 of the link mechanism 43 of the rotational speed change-over mechanism 24. Thus, as the rotational speed change-over mechanism 24 is changed over to its high speed rotation transmitting condition, the take-up side brake member 135 is brought into its non-braking condition as shown in FIG. 22b.

The back tension mechanism 26 is designed so as to apply a light resisting force to the supply side reel base 30 and the take-up side reel base 31 in order to prevent slackening of the magnetic tape 71d of the cassette 71. Referring to FIG. 5, the back tension mechanism 26 includes a supply side back tension means 26a for applying a resisting force to the supply side reel base 30, and a take-up side back tension means 26b for applying a resisting force to the take-up side reel base 31.

Figure 24:
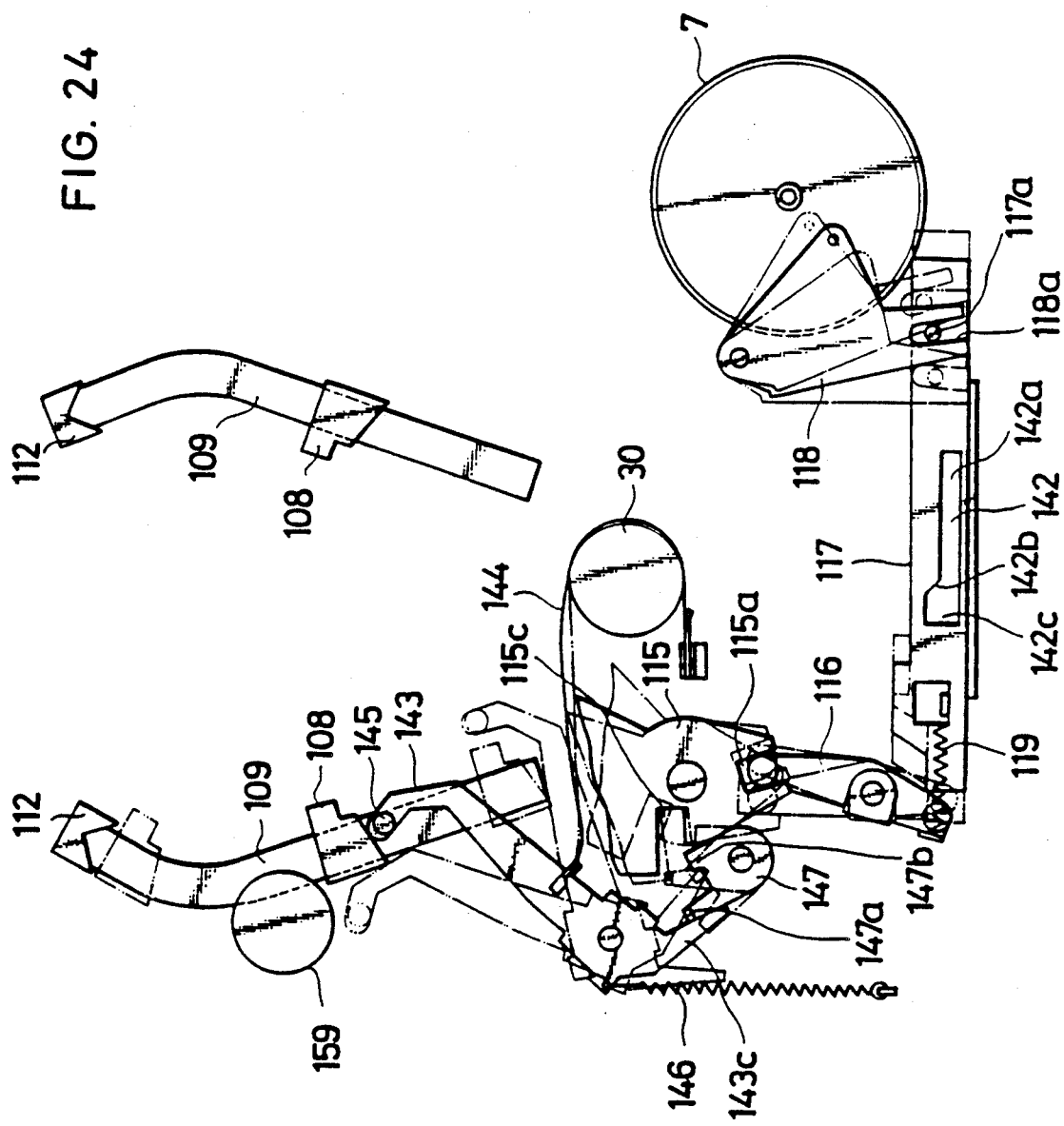
FIG. 24 is a schematic illustration showing operation of a supply side back tension mechanism of the device of FIG. 1.

Referring also to FIG. 24, the supply side back tension means 26a includes a tension arm 143 supported at one end thereof for pivotal motion within a predetermined angular rage on the upper face of the chassis 2, and a brake band 144 for contacting with the smaller diameter circumferential side face 30b of the supply side reel base 30. A tension pole 145 is securely erected uprightly on an upper face at the other end of the tension arm 143. The brake band 145 extends along the outer periphery of the smaller diameter circumferential side face 30b of the supply side reel base 30 and is secured at one end thereof to the tension arm 143 and at the other end thereof to the upper face of the chassis 2. The tension arm 143 has first and second engaging projections or bent lugs 143a, 143b formed on opposite sides of one end portion thereof, and the first and second bent lugs 143a, 143b extend into a pair of arcuate guide holes 2f, 2g, respectively, formed in the chassis 2 so that the tension arm 143 may be pivoted back and forth within an angular range of the arcs of the guide holes 2f, 2g. The tension arm 143 is normally biased in a direction to apply a resisting force to the supply side reel base 30, that is, in the counterclockwise direction in FIGS. 5 and 24, by a coil spring 146. The coil spring 146 is located on the lower face of the chassis 2 and has one end secured to the first bent lug 143a of the tension arm 143 and the other end secured to the chassis 2. Thus, when the tape loading mechanism 22 is in its unloading condition, a side face of the leading guide block 108 of one of the loading arms 102 on the left-hand side in FIGS. 5 and 24 is abutted with the tension arm 143 to hold the tension arm 143 at a limit position of the clockwise movement in FIG. 5 against the biasing force of the coil spring 146. In this condition, the brake band 144 is in a slackened condition so that no resisting force is applied to the supply side reel base 30. To the contrary, as the loading arm 102 is moved toward the loading side from this position, the tension arm 143 is pivoted in the counterclockwise direction in FIGS. 5 and 24 by the biasing force of the coil spring 146, and when it reaches its limit position of the pivotal motion, the brake band 144 is brought into a taut condition so that it is pressed against the smaller diameter circumferential side face 30b of the supply side reel base 30 to apply a resisting force to the reel base 30, thereby preventing slackening of the magnetic tape 71d during forward feeding of the magnetic tape 71d. A third engaging projection or extension 143c is formed at the one end of the tension arm 143. The third engaging projection 143c of the tension arm 143 is abutted, upon completion of a loading operation, with a first engaging projection or bent lug 147a of a pivotal arm 147 to inhibit pivotal motion of the tension arm 143 in the counterclockwise direction in FIG. 5 so that an excessive resisting force may not be applied to the supply side reel base 30. The pivotal arm 147 is supported for pivotal motion on the lower face of the chassis 2 as shown in FIG. 6. The first engaging projection 147a of the pivotal arm 147 extends through an arcuate guide hole 2h formed in the chassis 2 and upwardly beyond the chassis 2. The pivotal arm 147 has a second engaging projection or bent lug 147b formed thereon, and the second engaging projection 147b is engaged in a second recess 115c of the sector gear 115 of the tape loading mechanism 22 when a loading operation of the tape loading mechanism 22 is completed.

Figure 25:
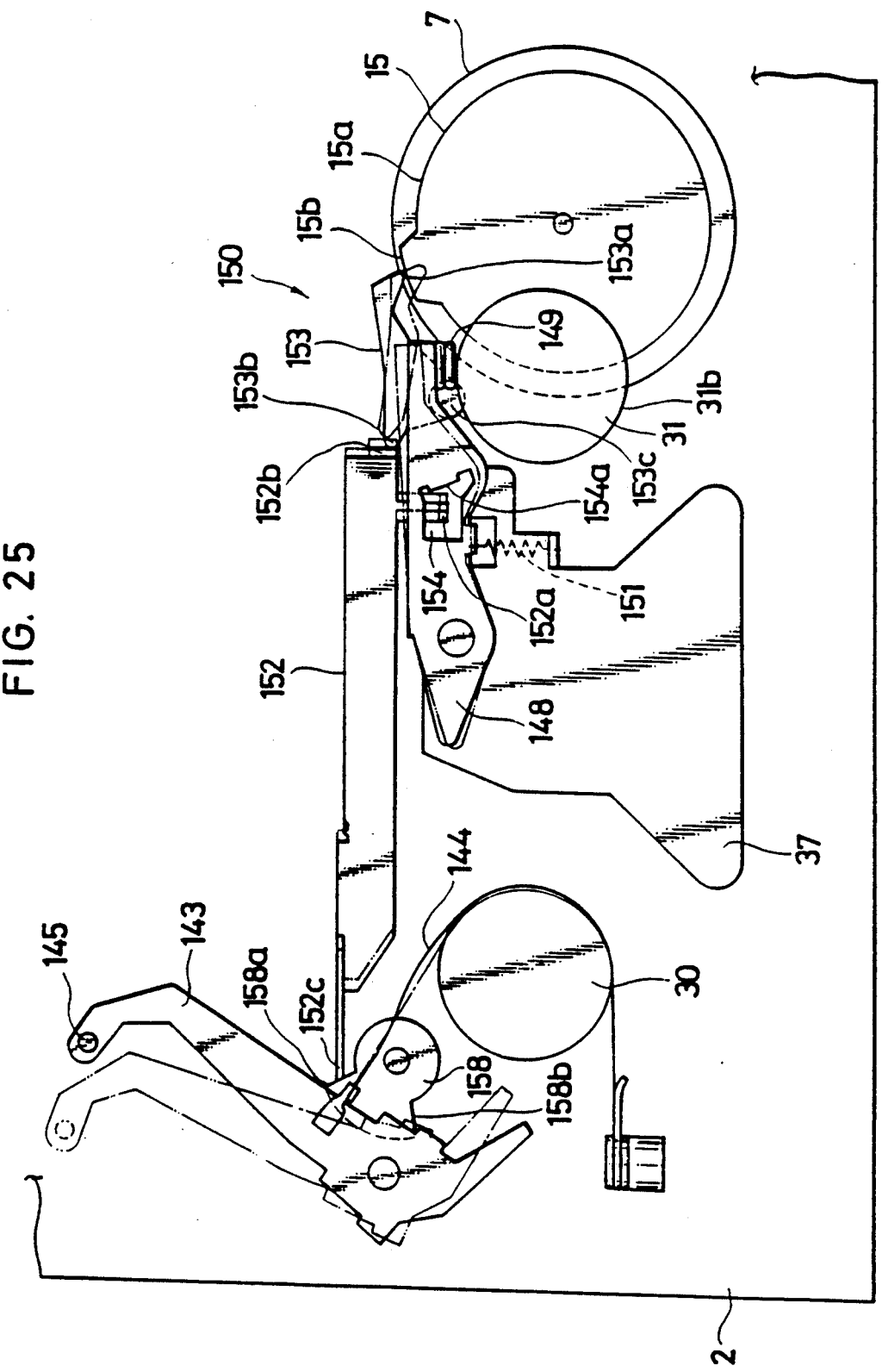
FIG. 25 is a schematic illustration showing operation of a take-up side back tension mechanism.

Referring to FIGS. 5, 6 and 25, the take-up side back tension means 26b includes a tension arm 148 having one end supported for back and forth pivotal motion within a predetermined angular range on the upper face of the sub-chassis 37, a brake shoe 149 for contacting with the smaller diameter circumferential side face 31b of the take-up side reel base 31, and a link mechanism 150 for operatively connecting the tension arm 148 to the first cam 15 of the cam plate 7. The tension arm 148 is normally biased in a direction to apply a resisting force to the take-up side reel base 31, that is, in a clockwise direction in FIGS. 5 and 25 by a coil spring 151. The coil spring 151 is located below the sub-chassis 37 and has one end secured to the tension arm 148 and the other end secured to the sub-chassis 37.

The link mechanism 150 is located on the chassis 2 and includes a slide lever 152 mounted for sliding movement within a predetermined rage on the lower face of the chassis 2, and a pivotal lever 153 supported for back and forth pivotal motion within a predetermined angular range on the lower face of the chassis 2.

The slide lever 152 has a first engaging projection 152a formed at and extending upwardly from a portion adjacent one end thereof, a second engaging projection 152b formed at and extending downwardly from the one end thereof, and a third engaging projection 152c formed at and extending upwardly from the other end thereof. The first engaging projection 152a is brought into or out of contact with an inclined edge 154a of a guide hole 154 perforated in the tension arm 148.

Thus, as the slide lever 152 is moved rightwardly in FIGS. 5 and 25 (leftwardly in FIG. 6) to abut the first engaging projection 152a thereof with the inclined face 154a of the guide hole 154, the tension arm 148 is pivoted in the counterclockwise direction in FIGS. 5 and 25 against the biasing force of the coil spring 151 to move the brake shoe 149 out of contact with the smaller diameter circumferential side face 31a of the take-up side reel base 31. To the contrary, as the slide lever 152 is moved leftwardly in FIGS. 5 and 25 (rightwardly in FIG. 6) to bring the first engaging projection 152a thereof out of contact with the inclined edge 154a of the tension arm 148, the tension arm 148 is pivoted in the clockwise direction in FIG. 5 by the biasing force of the coil spring 151 to press the brake shoe 149 thereof against the smaller diameter circumferential side face 31b of the take-up side reel base 31 to apply a resisting force to the take-up side reel base 31, thereby preventing slackening of the magnetic tape 71d upon rewinding of the magnetic tape 71d. The pivotal lever 153 has a first engaging portion 153a (see FIG. 25) at one end thereof and a second engaging portion 153b (see FIG. 25) at the other end thereof and is supported at a substantially central portion 153c thereof for pivotal on the lower face of the chassis 2. The first engaging portion 153a of the pivotal lever 153 is slidably engaged with the first cam 15 of the cam plate 7 while the second engaging portion 153b at the other end of the pivotal lever 153 is abutted with the second engaging portion 152b at the other end of the slide lever 152. Thus, as the cam plate 7 is rotated by the predetermined angle in the clockwise direction in FIG. 6, the pivotal lever 153 is pivoted in the counterclockwise direction in FIG. 6 to retract the second engaging portion 153b thereof from its position engaged with the second engaging portion 152b of the slide lever 152 so that the slide lever 152 is slidably moved rightwardly in FIG. 5, that is, leftwardly in FIG. 6, to contact the first engaging portion 152a thereof with the inclined face 154a of the tension arm 148 and thus pivot the tension arm 148 in the counterclockwise direction in FIGS. 5 and 25 against the biasing force of the coil spring 151, thereby applying no resisting force to the take-up side reel base 31. The slide lever 152 is normally biased in the leftward direction in FIG. 6, that is, in a direction to abut the first engaging portion 152a thereof with the inclined face 154a of the tension arm 148 by the biasing force of a coil spring 155, thereby biasing the pivotal lever 153 in the counterclockwise in FIG. 6.

The coil spring 155 has one end secured to the slide lever 152 and the other end secured to the lower face of the chassis 2.

Meanwhile, the third engaging projection 152c of the slide lever 152 is brought into or out of contact with a pivotal member 158. The pivotal member 158 is supported for back and forth pivotal motion within a predetermined angular range on the lower face of the chassis 2 as shown in FIG. 6. The pivotal member 158 has first and second engaging shoulders 158a, 158b on opposite sides thereof. The third engaging projection 152c of the slide lever 152 is brought into or out of contact with the first engaging shoulder 158a of the pivotal member 158. Meanwhile, the second engaging projection 143b of the supply side tension arm 143 is brought into or out of contact with the second engaging shoulder 158b of the pivotal member 158. Thus, as the slide lever 152 is moved leftwardly in FIG. 5, that is, rightwardly in FIG. 6, so as to apply a resisting force to the take-up side reel base 31, the pivotal member 158 is pressed and pivoted in the clockwise direction in FIG. 6 by the slide lever 152. Upon pivotal motion of the pivotal member 158, the supply side back tension arm 143 is pressed and pivoted in the back tension canceling direction by the pivotal lever 158, thereby canceling the application of a resisting force to the supply side reel base 30.

It is to be noted that reference numeral 159 in FIG. 5 denotes an impedance roller supported for rotation at a predetermined location on the upper face of the chassis 2, and 160 a pivotal member having one end mounted for pivotal motion in a coaxial relationship with the impedance roller 159 and having an erasing head 161 mounted on an upper face of the other end thereof. The pivotal member 160 is normally biased in the clockwise direction in FIG. 5 by a torsion coil spring 162. Further, reference numeral 163 denotes a reproducing head.

Now, operation of the magnetic recording and reproducing device of the present invention having such a construction as described above will be described. I. In the cassette unloading condition:

(1) The cam plate 7 is in its cassette unloading mode position as shown in FIG. 6.

(2) The cassette loading mechanism 20 is in its unloading position as shown in solid lines in FIGS. 2 and 3.

(3) The turning force transmission change-over mechanism 21 is in its turning force transmission enabling position in which the pinch roller 93 is pressed against the endless belt 25 as shown in FIG. 12.

(4) The tape loading mechanism 22 is in its unloading position as shown in solid lines in FIG. 14.

(5) The pinch roller driving mechanism 23 is in an inoperative position wherein the pinch roller 120 is spaced farthest away from the capstan 28 as shown in two-dot chain lines in FIG. 15.

(6) The rotational speed change-over mechanism 24 is in its neutral position wherein the first movable member 56 of the link mechanism 43 thereof is at its rightward limit position in FIG. 5 against the biasing force of the coil spring 59 and the second movable member 57 is at its leftward limit position in FIG. 5 under the biasing force of the coil spring 60 with the connecting mechanism 61 positioned in its disconnecting position wherein the turning force of the second pulley 39 of the third motion transmitting mechanism 29 is not transmitted to the first gear 44 of the rotational speed change-over mechanism 24.

(7) The brake mechanism 25 is in its braking position wherein it applies a braking force to both of the reel bases 30, 31 as shown in FIGS. 5 and 21a.

(8) The back tension mechanism 26 is in its back tension canceling position wherein neither of the supply side back tension means 26a and the take-up side back tension means 26b thereof applies a resisting force to the supply side reel base 30 or the take-up side reel base 31.

(9) The brake lever 99 for locking the cassette loading mechanism 20 is in its non-locking position in which the brake shoe 100 is spaced away from the gear 91 of the fourth motion transmitting mechanism 87 as shown in FIG. 12.

(II) In this condition, if a cassette 71 is inserted into the cassette housing 70 to a predetermined set position, such insertion is detected by the detecting switch not shown, and in response to such detection signal, the capstan motor 4 is energized to rotate in one direction, that is, in the clockwise direction in FIG. 6. The turning force of the capstan motor 4 is transmitted via the second motion transmitting mechanism 27, pinch roller 93, gear 94 and fourth motion transmitting mechanism 87 to the motion transmitting gear mechanisms 77, 78 of the cassette loading mechanism 20 so that the cassette loading mechanism 20 is driven toward the loading side to load the cassette 71 to its loaded position.

After completion of such cassette loading, this is detected by a detecting switch (not shown), and in response to such detection signal, driving rotation of the capstan motor 4 is stopped, thereby stopping driving of the cassette loading mechanism 20.

Upon such stopping of driving rotation of the capstan motor 4, this is detected by a detecting switch, and in response to such detection signal, the cam motor 3 is energized to rotate in the forward direction, that is, in the clockwise direction in FIG. 6. The turning force of the cam motor 3 is transmitted via the first motion transmitting mechanism 6 to the cam plate 7 so that the cam plate 7 is rotated in the forward direction, that is, in the clockwise direction in FIG. 6. Upon rotation of the cam plate 7, the engaging pin 98a of the pivotal lever 98 of the turning force transmission change-over mechanism 21 and the engaging pin 58b of the pivotal lever 58 of the rotational speed change-over mechanism 24 successively ride over from a larger diameter portion 17a to a smaller diameter portion 17b (refer to FIG. 9) of the second cam 17 of the cam plate 7 so that the turning force transmission change-over mechanism 21 is changed over to its turning force transmission disabling position as shown in two-dot chain lines in FIG. 12 while the rotational speed change-over mechanism 24 is changed over to its low speed rotation transmitting position as shown in FIG. 17. Further, the brake lever 99 for locking the cassette loading mechanism 20 is brought into its locking position as shown in two-dot chain lines in FIG. 12. After then, driving rotation of the cam motor 3 is stopped, thereby entering a stand-by condition.

In particular, as the engaging pin 98a of the pivotal lever 98 of the turning force transmission change-over mechanism 21 is engaged with the smaller diameter portion 17b of the second cam 17 of the cam plate 7, the pivotal lever 98 is pivoted in the counterclockwise direction in FIG. 6. Upon such pivotal motion of the pivotal lever 98, the movable member 92 is pivoted in the counterclockwise direction in FIG. 6 by the biasing force of the coil spring 95 to slidably move the slide lever 97 in the rightward direction in FIG. 12 so that the pinch roller 93 is spaced away from the endless belt 35 of the third motion transmitting mechanism 27, thereby establishing the motion transmission disabling condition as indicated in two-dot chain lines in FIG. 12.

Meanwhile, as the engaging pin 58b of the pivotal lever 58 of the rotational speed change-over mechanism 24 is engaged with the smaller diameter portion 17b of the second cam 17 of the cam plate 7, the pivotal lever 58 is pivoted in the counterclockwise direction in FIG. 6 so that only the first movable member 56 connected to the pivotal lever 58 is moved leftwardly in FIG. 5 by the biasing force of the coil spring 59, thereby entering the low speed rotation transmitting condition as shown in FIG. 17.

As the first movable member 56 is moved leftwardly in FIG. 5, the connecting mechanism 61 is brought into its connecting position.

Further, as the slide lever 97 is slidably moved, the brake lever 99 for locking the cassette loading mechanism 20 is slidably moved rightwardly in FIG. 12 by the biasing force of the coil spring 101 to press the brake shoe 100 thereon against the gear 91 of the fourth motion transmitting mechanism 87 to apply a braking force to the gear 91, thereby locking the cassette loading mechanism 20 so that it may not operate inadvertently.

(III) Then, if a reproducing mode setting operating member at the mode setting section is manually operated in the stand-by condition of the magnetic recording and reproducing device 1, the cam motor 3 is energized to rotate in the forward direction and the capstan motor 4 is energized to rotate in the reverse direction, that is, in the counterclockwise direction in FIG. 6 while the cylinder motor 5 is energized to rotate in one direction, all in response to such operation signal, thereby to rotate the cam plate 7, capstan 28 and guide cylinder 106, respectively.

Figure 21B:
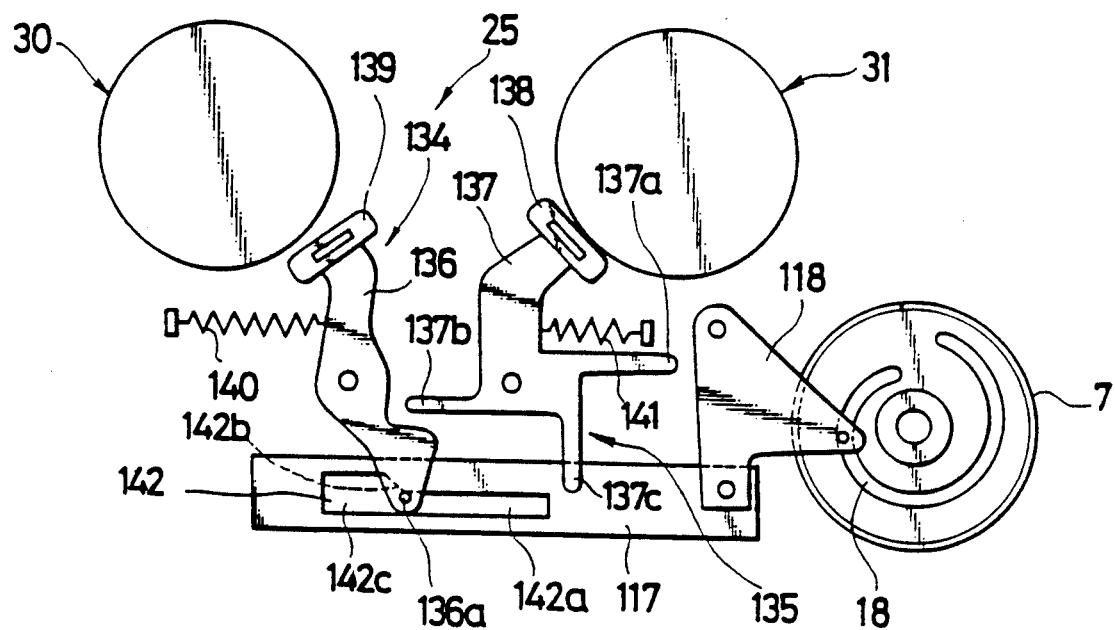

As the cam plate 7 is rotated forwardly by forward rotation of the cam motor 3, the second pivotal lever 118 of the link mechanism 105 of the tape loading mechanism 22 is pivoted in the counterclockwise direction in FIG. 6 to move the slide lever 117 connected thereto rightwardly in FIG. 6 so that the first engaging portion 136a of the arm 136 of the supply side brake member 134 of the brake mechanism 25 rides over to the reduced width portion 142a passing the inclined edge 142b of the engaging hole 142 of the slide lever 117 thereby to pivot the arm 136 in the clockwise direction in FIG. 5 against the biasing force of the coil spring 140, thereby canceling the application of the braking force to the supply side reel base 30 as shown in FIG. 21b.

Meanwhile, as the slide lever 117 of the link mechanism 105 of the tape loading mechanism 22 is moved rightwardly in FIG. 6, the sector gear 115 is pivoted in the clockwise direction in the same figure by way of the first pivotal lever 116 connected to the slide lever 117 so that both the loading arms 102 are moved to the loading side via the sector gear 115 and the gears 114 thereby to draw out the magnetic tape 71d from within the cassette 71 and extend it along the outer periphery of the guide cylinder 106 as shown in FIG. 14.

Further, as the loading arms 102 of the tape loading mechanism 22 are moved toward the loading side, the tension arm 143 of the supply side back tension means 26a of the back tension mechanism 26 is gradually pivoted by the predetermined angle in the counterclockwise direction in FIG. 5 by the biasing force of the coil spring 146 while it is held in contact with the corresponding leading guide block 108. Then, after the tension arm 143 is pivoted farther than a position in which it is spaced away from the leading guide block 108, that is, the position shown in solid lines in FIG. 24, as the sector gear 115 is pivoted in the clockwise direction in FIG. 6, the tension arm 143 is gradually pivoted in the counterclockwise direction in FIG. 5 to a position shown in two-dot chain lines in FIG. 24 with the third engaging projection 143c thereof held in abutting engagement with the first engaging projection 147a of the pivotal arm 147 which is pivoted in the counterclockwise direction in FIG. 6 while the second engaging projection 147b is admitted into the second recess 115c of the sector gear 115. Consequently, a resisting force is applied to the supply side reel base 30 by the brake band 144.

As the tension arm 143 is pivoted from the position shown in solid lines in FIG. 24 to the position shown in two-dot chain lines in the same figure, the second slide member 130 of the first transmitting mechanism 123 of the pinch roller driving mechanism 23 is slidably moved rightwardly in FIG. 6 by pivotal motion of the sector gear 115 in the clockwise direction in the same figure through engagement of the engaging projection 130b of the second slide member 130 in the engaging hole 115b of the sector gear 115. Consequently, the first transmitting mechanism 123 is operated to pivot the pivotal member 125 by a first step from the two-dot chain line position to the long and short dash line position in FIG. 15 to rapidly move the pinch roller 120 toward the capstan 28.

Figure 21C:
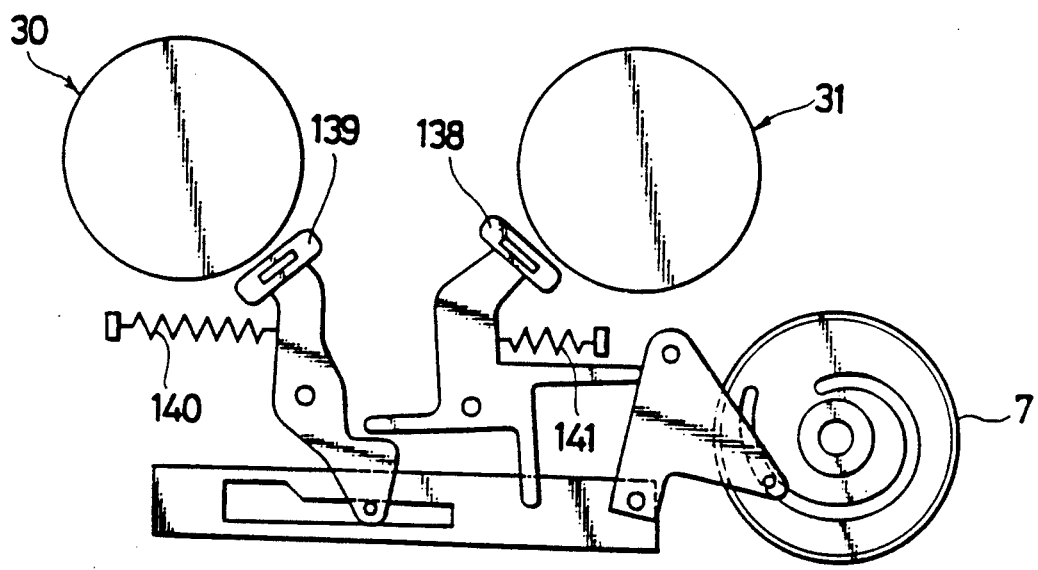

Meanwhile, as the second pivotal lever 118 of the link mechanism 105 of the tape loading mechanism 22 is pivoted in the counterclockwise direction in FIG. 6, the one side face of the pivotal lever 118 is abutted with the first engaging portion 137a of the arm 137 of the take-up side brake member 135 of the brake mechanism 25 so that the arm 137 is pivoted in the counterclockwise direction in FIG. 5 against the biasing force of the coil spring 141, thereby canceling the application of the braking force to the take-up side reel base 31 as shown in FIG. 21c.

After the leading guide blocks 108 of the tape loading mechanism 22 have been abutted with the respective stoppers 112 to stop the tape loading operation, the engaging pin 132b of the second pivotal member 132 of the second transmitting mechanism 124 of the pinch roller driving mechanism 23 rides over from a smaller diameter portion 15a to another larger diameter portion 15b (refer to FIG. 8) of the first cam 15 of the cam plate 7 so that the second transmitting mechanism 124 is operated to pivot the pivotal member 125 by a second step from the long and short dash line position to the solid line position in FIG. 15 until the capstan 28 is pressed against the pinch roller 120 with the magnetic tape 71d held therebetween. Consequently, the magnetic tape 71d is fed in a predetermined direction by the capstan 28, thereby establishing the reproducing mode.

After the reproducing mode has been entered, driving rotation of the cam motor 3 is stopped.

(IV) Then, if either a fast feeding mode setting operating member or a rewinding mode setting operating member in the mode setting section is manually operated when the magnetic recording and reproducing device 1 is in the reproducing mode, the cam motor 3 is driven to rotate in the reverse direction, that is, in the counterclockwise direction in FIG. 6 in response to such operation signal. Consequently, the cam plate 7 is rotated in the reverse direction, that is, in the counterclockwise direction in FIG. 6, from the reproducing mode position to the fast feeding or rewinding mode position, that is, until the engaging pin 58b of the pivotal lever 58 of the rotational speed change-over mechanism 24 is engaged with the greater diameter portion 17a of the second cam 17 and the engaging pin 98a of the pivotal lever 98 of the rotation transmission change-over mechanism 21 is engaged with the smaller diameter portion 17b of the second cam 17.

As the cam plate 7 is rotated in the reverse direction, the back tension mechanism 26 is operated reversely so that the application of a resisting force to the supply side reel base 30 by the supply side back tension means 26a is canceled.

Meanwhile, as the cam plate 7 is rotated reversely, the second transmitting mechanism 124 of the pinch roller driving mechanism 26 is operated reversely so that the pivotal member 125 is pivotally returned to its second step pivotal motion starting position, that is, its first step pivotal motion ending position as shown in long and short dash lines wherein the pinch roller 120 is spaced a little distance away from the capstan 28.

Further, as the cam plate 7 is rotated reversely, the second pivotal lever 118 of the link mechanism 105 of the tape loading mechanism 22 is operated reversely so that the arm 137 of the take-up side brake member 135 of the brake mechanism 25 is pivoted by the biasing force of the coil spring 141 to the position in which it applies a braking force to the take-up side reel base 31.

Meanwhile, as the cam plate 7 is rotated reversely, the first transmitting mechanism 123 of the pinch roller driving mechanism 23 is operated reversely so that the pivotal member 125 thereof is returned to its first step pivotal motion starting position to return the pinch roller 120 to its initial position shown in two-dot chain lines in FIG. 15.

Besides, as the cam plate 7 is rotated reversely, the tape loading mechanism 22 is operated reversely so that the loading arms 102 thereof are returned to their initial positions shown in solid lines in FIG. 14.

Since the reverse operation of the tape loading mechanism 22 causes the supply side brake member 134 of the brake mechanism 25 to move the first engaging portion 136a of the arm 136 out of engagement with the inclined face 142b into engagement with the increased width portion 142c of the engaging hole 142 of the slide lever 117, the arm 136 is pivoted by the biasing force of the coil spring 140 to its position wherein it applies a braking force to the supply side reel base 30.

As the cam plate 7 is rotated reversely, the engaging pin 58b of the pivotal lever 58 of the link mechanism 43 of the rotational speed change-over mechanism 24 rides over from the smaller diameter portion 17b to the larger diameter portion 17a of the second cam portion 17 of the cam plate 7 so that the first movable member 56 is moved in the rightward direction in FIG. 5 against the biasing force of the coil spring 59 together with the second movable member 57 which is in its connected condition to the first movable member 56 by the connecting mechanism 61.

As the first and second movable members 56, 57 are moved in this manner, the third engaging portion 137c of the arm 137 of the take-up side brake member 135 is engaged by the third engaging projection 57c of the second movable member 57 so that the arm 137 is pivoted in the counterclockwise direction in FIG. 5 against the biasing force of the coil spring 141, thereby canceling the application of the braking force to the take-up side reel base 31 as shown in FIG. 22b.

Figure 22A:
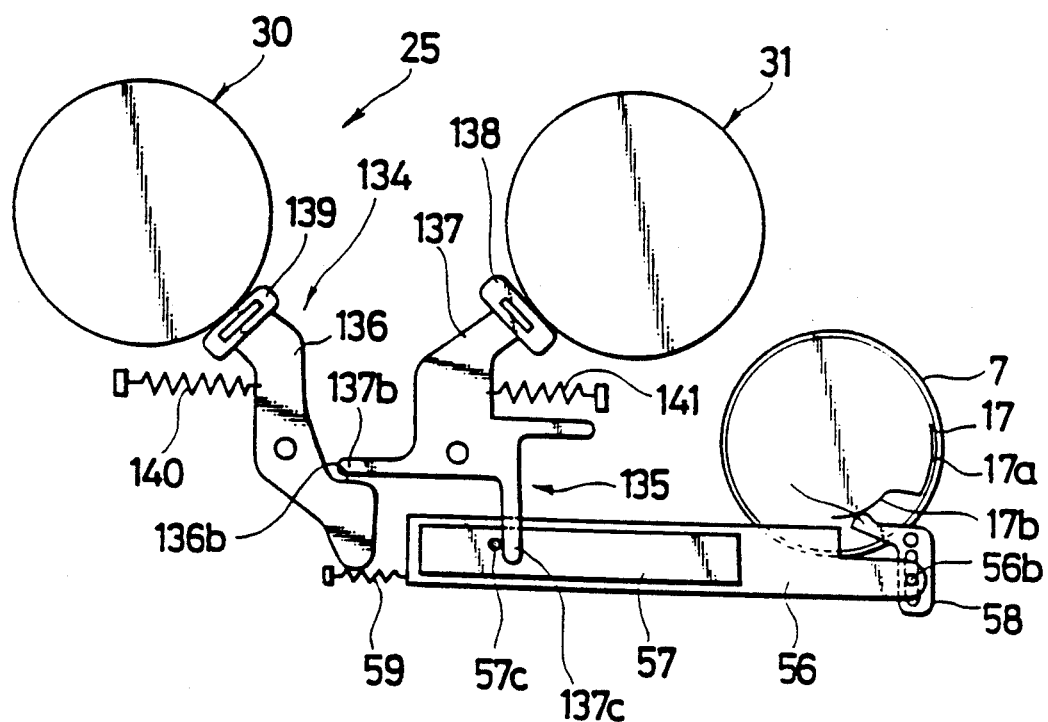
FIGS. 22a and 22b are schematic views showing different positions of the brake mechanism when the device of FIG. 1 is in the fast feeding more or in the rewinding mode.
Figure 22B:
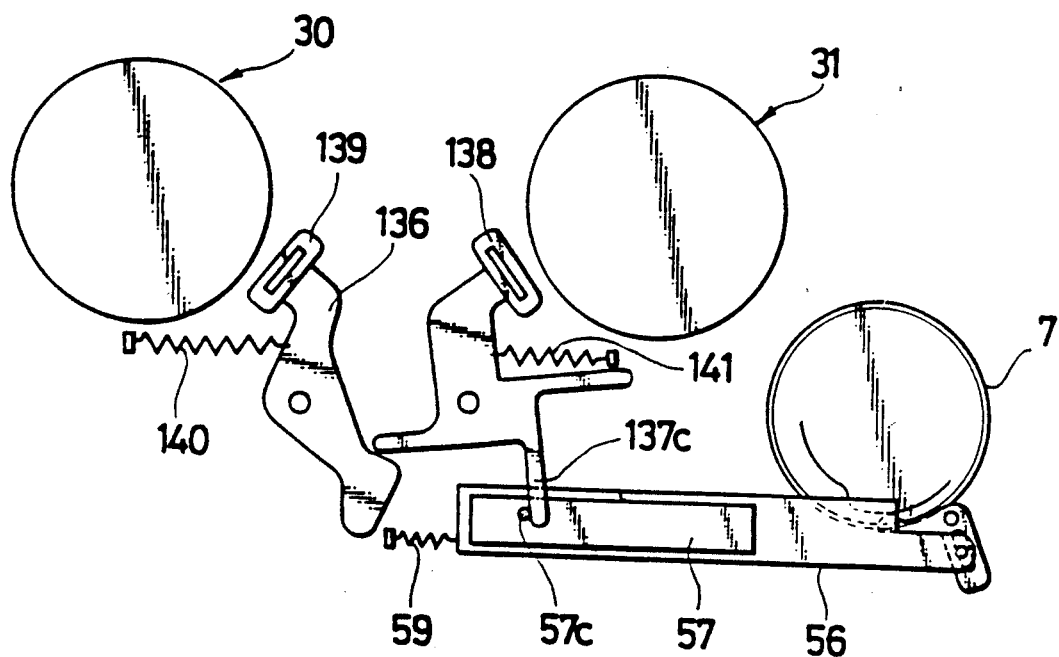

As the arm 137 is pivoted in the braking canceling direction, the second engaging portion 137b of the arm 137 is abutted with the second engaging portion 136b of the arm 136 of the supply side brake member 134 so that the arm 136 is pivoted in the clockwise direction in FIG. 5 from the position shown in FIG. 22a to the position shown in FIG. 22b against the biasing force of the coil spring 140, thereby canceling the application of the braking force to the supply side reel base 30.

Further, as the first and second movable members 56, 57 are moved in the rightward direction in FIG. 5, the rotational speed change-over mechanism 24 is changed over to its high speed rotation transmitting condition as shown in FIG. 16 in which the magnetic tape 71d is fed at a high speed.

It is to be noted that as the first and second movable members 56, 57 are moved in the rightward direction in FIG. 5, the engaging teeth 65a of the rotary member 65 of the canceling mechanism 64 are successively contacted with the abutting member 67, but since the rotary member 65 rotates in the clockwise direction in FIG. 5 as the cam motor 3 rotates in the forward direction, the connecting mechanism 61 remains in its connecting condition wherein the movable members 56, 57 remain in their mutually connected condition as shown in FIG. 23a.

(V) If the reproducing mode setting operating member at the mode setting section is operated when the magnetic recording and reproducing device 1 is in the fast feeding or rewinding mode, the cam motor 3 is rotated, in response to such operation signal, from the fast feeding or rewinding mode position to the reproducing mode position thereof.

Thus, as the cam plate 7 is rotated in the forward direction, the rotary member 65 of the canceling mechanism 64 is rotated in the counterclockwise direction in FIG. 5 so that the engaging teeth 65a thereof are abutted with and pushes the abutting member 67 to pivot in the clockwise direction in the same figure, thereby canceling the connected condition between the first and second movable members 56, 57 by the connecting mechanism 61 as shown in FIG. 23b.

As the connecting condition of the connecting mechanism 61 is canceled, only the second movable member 57 is slidably moved leftwardly in FIG. 5 by the biasing force of the coil spring 60 so that the take-up side brake member 135 is pivoted in the clockwise direction in FIG. 5 by the biasing force of the coil spring 141 thereby to apply a braking force to the take-up side reel base 31 for a time until the reproducing mode is actually started. Meanwhile, the supply side brake member 134 is also pivoted by the biasing force of the coil spring 140 thereby to apply a braking force also to the supply side reel base 30 for the time until the reproducing mode is started.

Meanwhile, as the cam plate 7 is rotated to the reproducing mode position, the other various mechanisms are individually set to respective conditions for the reproducing mode in a similar manner as described in paragraph (III) above, and thus the reproducing mode is entered.

(VI) If a review mode setting operating member at the mode setting section is operated when the magnetic recording and reproducing device 1 is in the reproducing mode, the cam motor 3 is rotated reversely in response to such operation signal. Consequently, the cam plate 7 is rotated reversely to operate the pinch roller driving mechanism 23 reversely to move the pinch roller 120 away from the capstan 28. After then, if a predetermined time (for example, 0.4 seconds) elapses, then the cam motor 3 is rotated now forwardly until the cam plate 7 is rotated to its review position. As the cam plate 7 is rotated in this manner, the pinch roller driving mechanism 23 is operated forwardly to press the pinch roller 120 against the capstan 28 again.

As the cam plate 7 is rotated, the first engaging portion 153a of the pivotal lever 153 of the link mechanism 150 of the take-up side back tension means 26b of the back tension mechanism 26 rides over from the smaller diameter portion 15a to the larger diameter portion 15b of the first cam 15 thereby to pivot the pivotal lever 153 in the counterclockwise direction in FIG. 25 to move the slide lever 152 in the leftward direction in FIG. 5 opposite to the direction of the biasing force of the coil spring 155. As the slide lever 152 is moved, the engaging projection 152a thereof is brought out of contact with the inclined edge 154a of the guide hole 154 of the tension arm 148 of the take-up side back tension means 26b. Consequently, the tension arm 148 is pivoted in the clockwise direction in FIG. 5 by the biasing force of the coil spring 151 thereby to apply a resisting force to the take-up side reel base 31 as shown in solid lines in FIG. 25.

Meanwhile, as the slide lever 152 is moved in the leftward direction in FIG. 5, the third engaging projection 152c thereof is abutted with the first engaging projection 158a of the pivotal member 158 and pushes the pivotal member 158 to pivot in the clockwise direction in FIG. 6. As the pivotal member 158 is pivoted, the second engaging projection 158b thereof is abutted with the third engaging projection 143c of the tension arm 143 of the supply side back tension means 26a to pivot the tension arm 143 in the clockwise direction in FIG. 5 to such a position as shown in solid lines in FIG. 24 against the biasing force of the coil spring 146. Consequently, the application of the resisting force to the supply side reel base 30 by the brake band 144 is canceled. Then, the review mode is executed.

Figure 26:
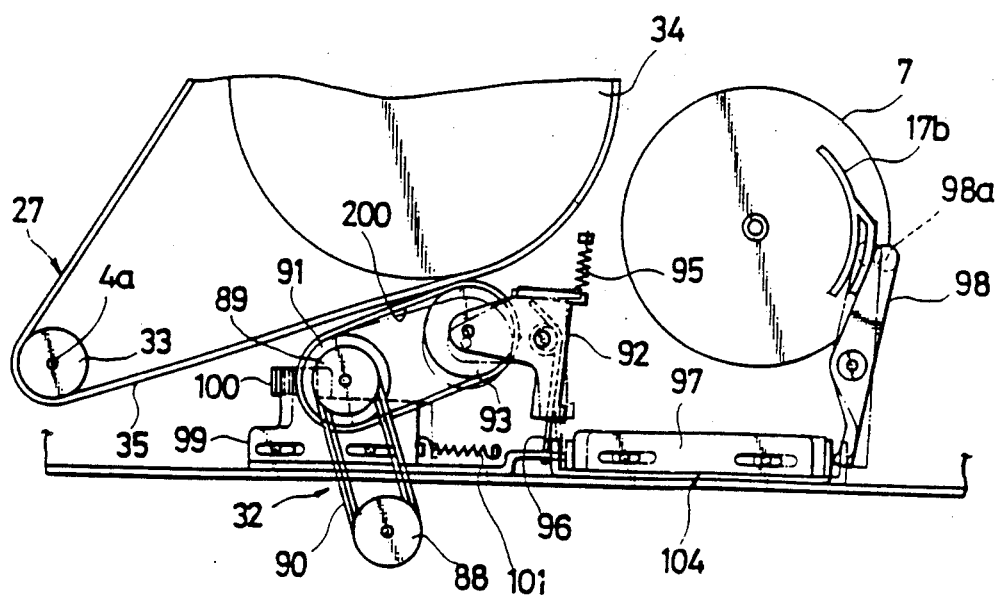
FIG. 26 is a view similar to FIG. 12 showing a modification to the turning force transmission change-over mechanism of FIG. 12.

Referring to FIG. 26, there is shown a modification to the connection between the pinch roller 93 and the fourth power transmitting mechanism 87 of the embodiment described above. In particular, while in the embodiment described described above the connection between the pinch roller 93 and the fourth power transmitting mechanism 87 is attained by the meshing engagement between the gear 94 integral with the pinch roller 93 and the gear 91 integral with the pulley 89 of the fourth power transmitting mechanism 87 as seen in FIGS. 12 and 13, the arrangement of FIG. 26 is modified such that the pinch roller 93 is formed as a pulley without the gear 94 while the gear 91 is formed as another pulley integral with the pulley 89, and an endless belt 200 extends between and around the pulleys 93, 91 and is arranged for contacting engagement with the outer periphery of the endless belt 35 of the second power transmitting mechanism 27. Construction and operation of the remaining parts of the modified arrangement of FIG. 26 may be similar to those of the corresponding parts of the arrangement of FIG. 12 described above, and accordingly the remaining parts are denoted by like reference symbols to those of FIG. 12 and description thereof is omitted herein.

Figure 27:
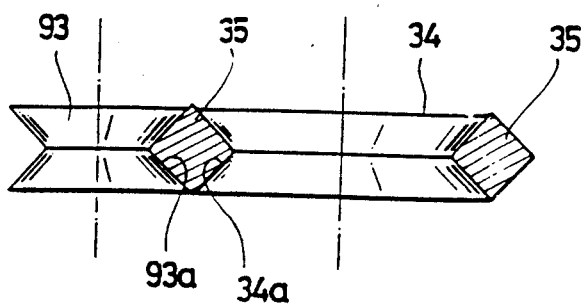
FIG. 27 is a schematic sectional view showing another modification to the turning force transmission change-over mechanism of FIG. 1.

Referring to FIG. 27, there is shown a modification to the motion transmission between the endless belt 35 and the pinch roller 93 shown in FIG. 12. In the modified arrangement shown in FIG. 27, the endless belt 35 is formed as an angular belt having a substantially square cross section while the pulley 34 and the pinch roller 93 without the gear 94 are formed as pulleys having V-shaped circumferential grooves 34a, 93a formed therein, respectively, in which the endless belt 35 is received. With the arrangement of FIG. 27, transmission of a power between the endless belt 12 and the pinch roller 93 is assured. It is to be noted that in this instance the other smaller diameter pulley 33 of FIG. 12 naturally has a V-shaped circumferential groove formed for receiving the endless belt 12 therein.

Having now fully described the invention, it will be apparent to one of ordinary skill in the art that many changes and modifications can be made thereto without departing from the spirit and scope of the invention as set forth herein.

What is claimed is:

1. In a magnetic recording and reproducing device which includes a cassette loading mechanism which, when a cassette is inserted to a predetermined condition into a cassette housing, moves the cassette to a loaded position in which the cassette is fitted on reel shafts and which discharges, in response to a cassette unloading instruction signal, the cassette from the loaded position outwardly of said cassette housing and wherein rotation of a capstan motor is transmitted to a tape driving mechanism by way of a pair of pulleys and an endless belt, the improvement comprising:
   a movable member;
   a rotatable pinch roller mounted on said movable member and connected to said cassette loading mechanism; and
   means for pressing said pinch roller against said endless belt so that said pinch roller is rotated by said endless belt in order to drive said cassette loading mechanism by a turning force of said pinch roller.

2. A magnetic recording and reproducing device as claimed in claim 1, wherein said pinch roller is pressed against a portion of said endless belt extending around one of said pulleys.

3. A magnetic recording and reproducing device as claimed in claim 1, wherein said endless belt is in the form of an angular belt while each of said pulleys and said pinch roller has a V-shaped circumferential groove in which said endless belt can be engaged.

4. A magnetic recording and reproducing device as claimed in claim 1, further comprising a coil spring connected between said movable member and said cassette housing to normally bias said pinch roller away from said endless belt.

5. A magnetic recording and reproducing device as claimed in claim 4, wherein said means for pressing includes a torsion coil spring coupled to said movable member which exerts a pressing force on said pinch roller against said endless belt when said movable member is pivoted in a predetermined direction against the biasing force of said coil spring.

* * * * *